(12) United States Patent
Okuno

(10) Patent No.: US 6,707,619 B1
(45) Date of Patent: Mar. 16, 2004

(54) VIDEO CAMERA DEVICE

(75) Inventor: Satoshi Okuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/442,918

(22) Filed: Nov. 18, 1999

(30) Foreign Application Priority Data

Nov. 20, 1998 (JP) .......................................... 10-330388

(51) Int. Cl.[7] .............................. G02B 15/14; G02B 7/02
(52) U.S. Cl. ...................... 359/694; 359/704; 359/822
(58) Field of Search ................................. 359/694, 703, 359/704, 822; 348/374, 208.11

(56) References Cited

U.S. PATENT DOCUMENTS 4,901,146 A  2/1990  Struhs et al.
5,537,251 A * 7/1996  Shimada ...................... 359/462
6,603,930 B2 * 8/2003  Suzuki ........................ 396/144

FOREIGN PATENT DOCUMENTS

EP          0 810 791          12/1997

\* cited by examiner

Primary Examiner—Ricky Mack
(74) Attorney, Agent, or Firm—Frommer Lawrence & Haug LLP; William S. Frommer

(57) ABSTRACT

The invention is aimed to miniaturize an angle adjustment mechanism of a mirror barrel and simplify the structure thereof. A ball joint mechanism in which a spherical portion provided to the base end of a mirror barrel is joined to a spherical portion support table provided to a main chassis by a joint ring is constructed, and the rotation of the mirror barrel in three axial directions around the center of the spherical portion can be performed.

10 Claims, 34 Drawing Sheets

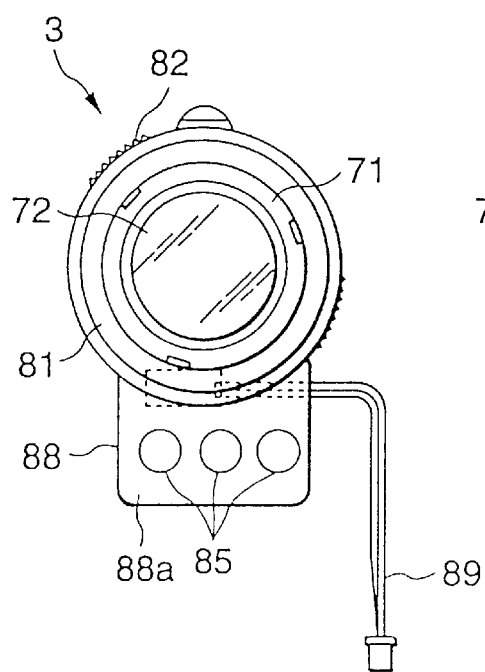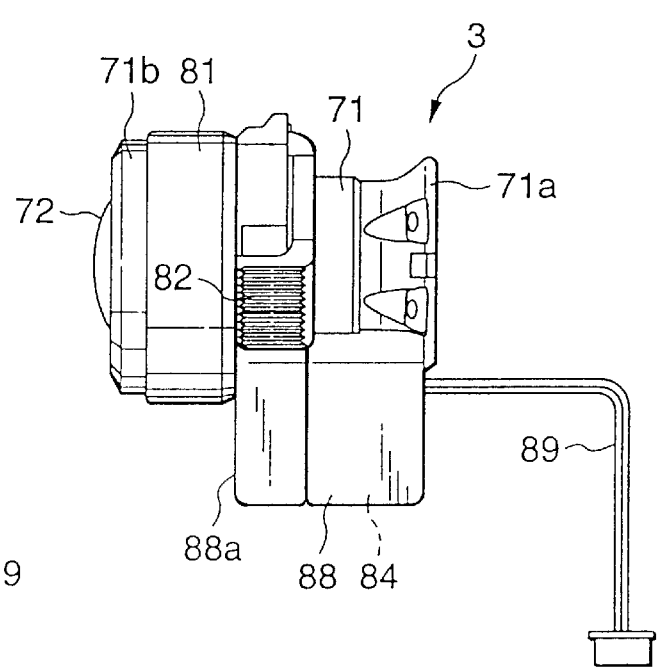

FIG.33A
FIG.33B
FIG.33C
FIG.33D
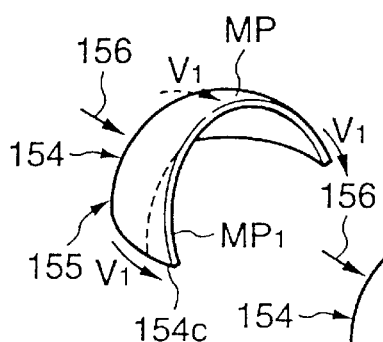
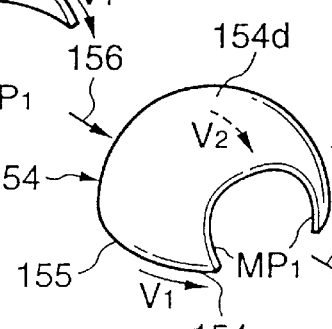
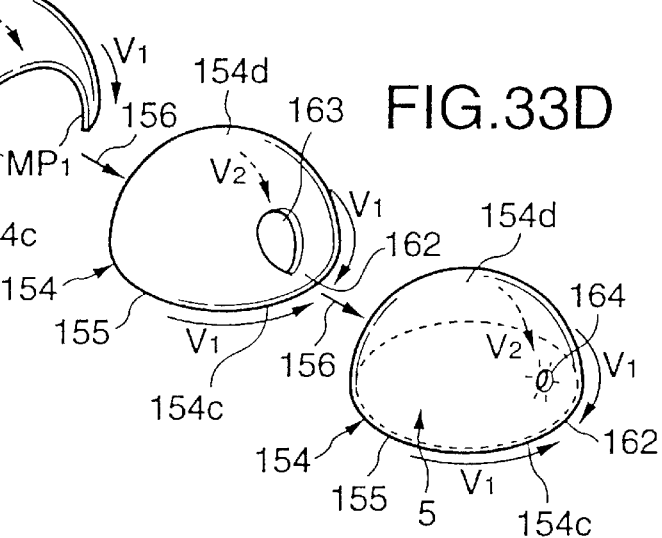

VIDEO CAMERA DEVICE

BACKGROUND OF THE INVENTION

1. Field of the Invention

The present invention relates to a video camera device which is most suitably applied to a dome-type video camera device which does not aim at intimidation, is mounted on the ceiling, wall or the like of a building so that it is not conspicuous, and used for the purpose of surveillance while the surveillance is made unnoticed, and particularly belongs to a technical field of an angle adjustment mechanism of a lens.

2. Description of the Related Art

There has been hitherto known a dome-type video camera device which is mounted on the ceiling, wall or the like of a building under unnoticed condition to keep the place under surveillance through video images or sound collection in order to ensure safety in a hospital, a hotel, a department store or the like and enhance service performance.

In this type of the related art dome-type video camera device, a mirror barrel having a lens and a CCD (image pickup element) is secured through an angle adjustment to the front face of a barrel type main body so as to be freely rotatably adjustable in three axial directions, a sound collecting microphone is secured, and a dome-type cover of acrylic resin or the like is detachably secured to the front face of the barrel type main body so that the outer periphery of a movable area of the mirror barrel is covered by the dome-type cover. In the barrel type main body, a front-side chassis of metal plate to which an angle adjustment mechanism is secured is fabricated at the front surface side in the barrel type main body formed of ABS resin or the like, a back-side chassis provided with a connection portion of a coaxial cable which connects the barrel type main body and a monitor in a surveillance room is fabricated at the back surface side in the barrel type main body, and a circuit board is fabricated between the front-side chassis and the back-side chassis in the barrel type main body.

When the dome-type video camera device is mounted on the ceiling, wall or the like of a building, the coaxial cable for connecting the dome-type video camera device and the monitor television in the surveillance room is first connected to the connection portion of the back surface of the barrel type main body, then a rough set-up position of the barrel type main body is set so that the sound collecting microphone faces in a desired direction, and then the barrel type main body is fixed to the ceiling, wall or the like by set screws by the back-side chassis. Subsequently, the lens azimuth (direction and angle) is set to a desired azimuth by the angle adjustment mechanism, the zoom and focus of the lens are adjusted and an image pickup direction and an image pickup range are set while watching a monitor image. At this time, a portable monitor television may be connected to a monitor output terminal by a monitor output cable to ensure the image pickup direction and the image pickup range at a set-up place. Finally, the dome-type cover is secured to the front face of the barrel type main body for the purpose of dustproof, and then a series of set-up works is completed.

The angle adjustment mechanism of the conventional dome-type video camera device is designed by inserting a mirror barrel holder into the outer periphery of the base end (the opposite side to the front surface of the lens) of the mirror barrel, freely rotatably adjustably securing the mirror barrel to the mirror barrel holder at an angle of about 130° in a first axial direction which is a direction around the optical axis, freely rotatably adjustably securing the lens holder to the upper portion of the base table and of the lens holder in a second axial direction perpendicular to the optical axis at a symmetrical angle of about 75° from the center, and freely rotatably adjustably securing the lens holder base table to the front-side chassis in the barrel type main body at an angle of about 60° in a third axial direction which is a direction perpendicular to the second axial direction, thereby forming a three-axes independence type angle adjustment mechanism having three axes fabricated substantially in an oar shape. The sound collecting microphone and the monitor output terminal are secured to the lens holder base table so as to be adjustable in a range of about 60°.

However, since the related art dome-type video camera device adopts the three-axes independence system for the angle adjustment mechanism of the mirror barrel, the number of parts and the number of fabrication steps are large, the mechanism is complicated and designed in a large size, and the cost is high. Further, since the large-size angle adjustment mechanism is used, the overall size of the dome-type video camera device is large like the diameter thereof is about 120 mm and the height thereof is about 105 mm, and thus it loses its original object that the device is inconspicuously mounted on the ceiling, wall or the like. Further, in the three-axes independence type angle adjustment mechanism, the tip of the mirror barrel cannot be subjected to a swing motion (oscillating motion) at 360° with one point of the base end side at the center of the motion. Therefore, when the dome-type video camera device is mounted on the ceiling, wall or the like to set the image pickup direction and the image pickup range, a blind spot of the lens necessarily occurs. Therefore, if a rough set-up device is erroneously set when the dome-type video camera device is first fixed to the ceiling, wall or the like by set screws, a blind spot is liable to occur in a desired image pickup direction and a desired image pickup range even when an angle adjustment of the mirror barrel is made. In this case, a re-setup work for changing the setup device of the dome-type video camera device to the ceiling, wall or the like must be carried out. However, in many cases plaster boards are used for the ceiling, wall, etc., and thus when the re-setup work of the dome-type video camera device is carried out, the plaster boards thereof are liable to be damaged. Therefore, in order to avoid repapering of the plaster boards, it is necessary to secure an attachment between the ceiling, wall or the like and the dome-type video camera device in order to perform a rotational adjustment on the dome-type video camera device, and it causes further increase of the cost. Further, in the three-axes independence type angle adjustment mechanism, since the rotational center in the third axial direction of the mirror barrel is not coincident with the center of the spherical surface of the dome-type cover, there is a problem that when the lens angle adjustment is carried out, the distance between the dome-type cover and the lens is varied and thus large distortion is liable to occur in a pickup image.

The present invention has been implemented in order to solve the above problem, and has an object to provide a video camera device in which a lens angle adjustment mechanism can be designed in a compact size and the structure thereof is simplified.

SUMMARY OF THE INVENTION

In order to attain the above object, a video camera device of the present invention includes a ball joint mechanism designed so that a spherical portion provided to the base end of a mirror barrel is joined to a spherical portion supporting table provided to a chassis through a joint ring and the mirror barrel is rotatably adjusted in three axial directions around the center of the spherical portion of the mirror barrel.

In the video camera device according to the present invention thus constructed, the lens angle adjustment mechanism is constructed by the ball joint mechanism which comprises the spherical portion, the spherical portion supporting table and the joint ring, and can adjust the rotation of the mirror barrel in the three axial directions around the center of the spherical portion, thereby achieving a compact-size design of the lens angle adjustment mechanism and the simplification of the structure thereof.

BRIEF DESCRIPTION OF THE DRAWINGS

FIG. 3 is a front view when the dome-type video camera device is secured to the ceiling or like.

FIG. 12 is a front view and a side view showing a mirror barrel portion of an optical block in the dome-type video camera device.

FIG. 33 is a perspective view showing a gas burning phenomenon occurring in the injection molding process of the dome-type cover by a general injection molding apparatus.

DESCRIPTION OF THE PREFERRED EMBODIMENTS

Figure 1:
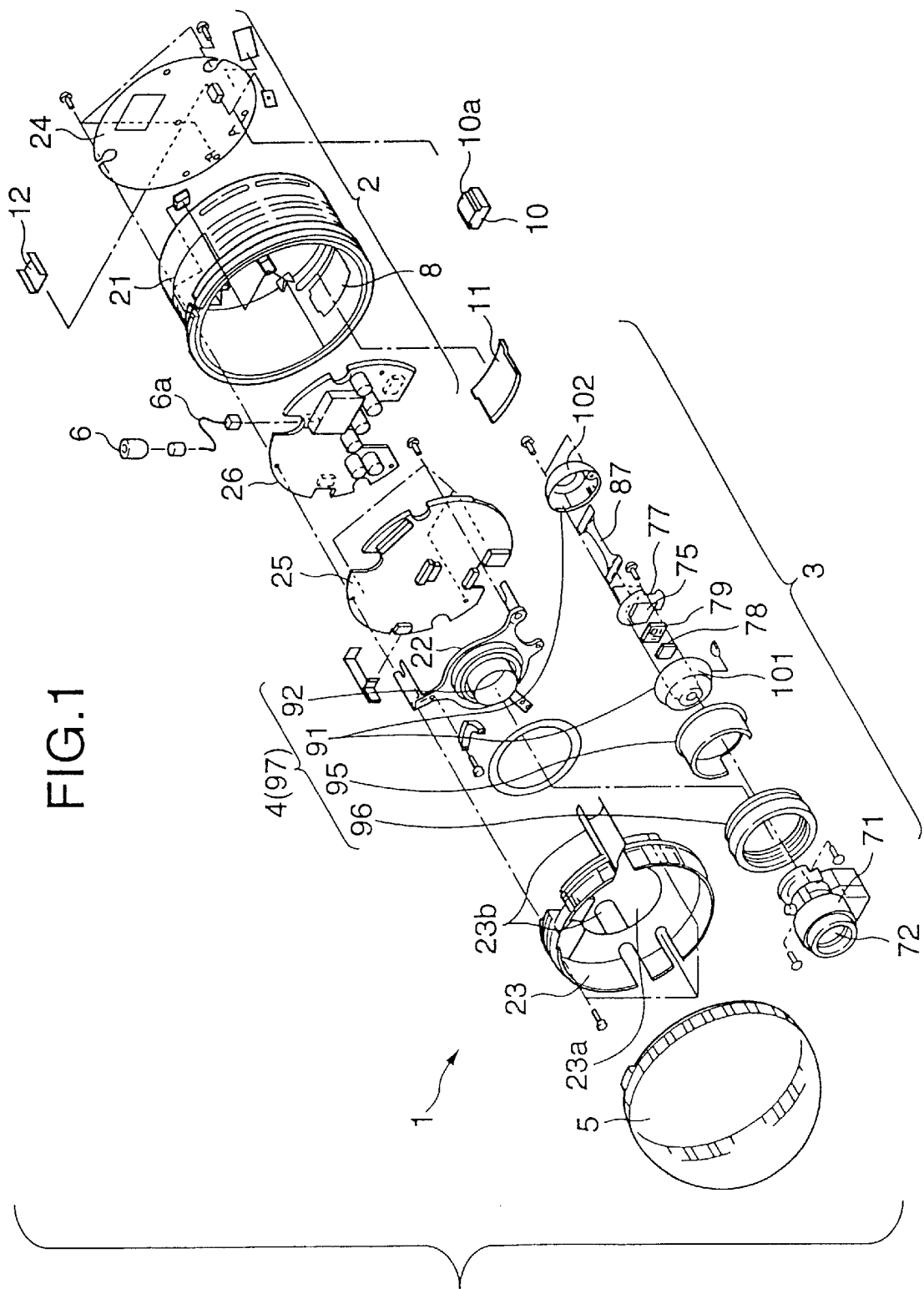
FIG. 1 is a perspective view showing the overall of an embodiment of a dome-type video camera device to which the present invention is applied.
Figure 2:
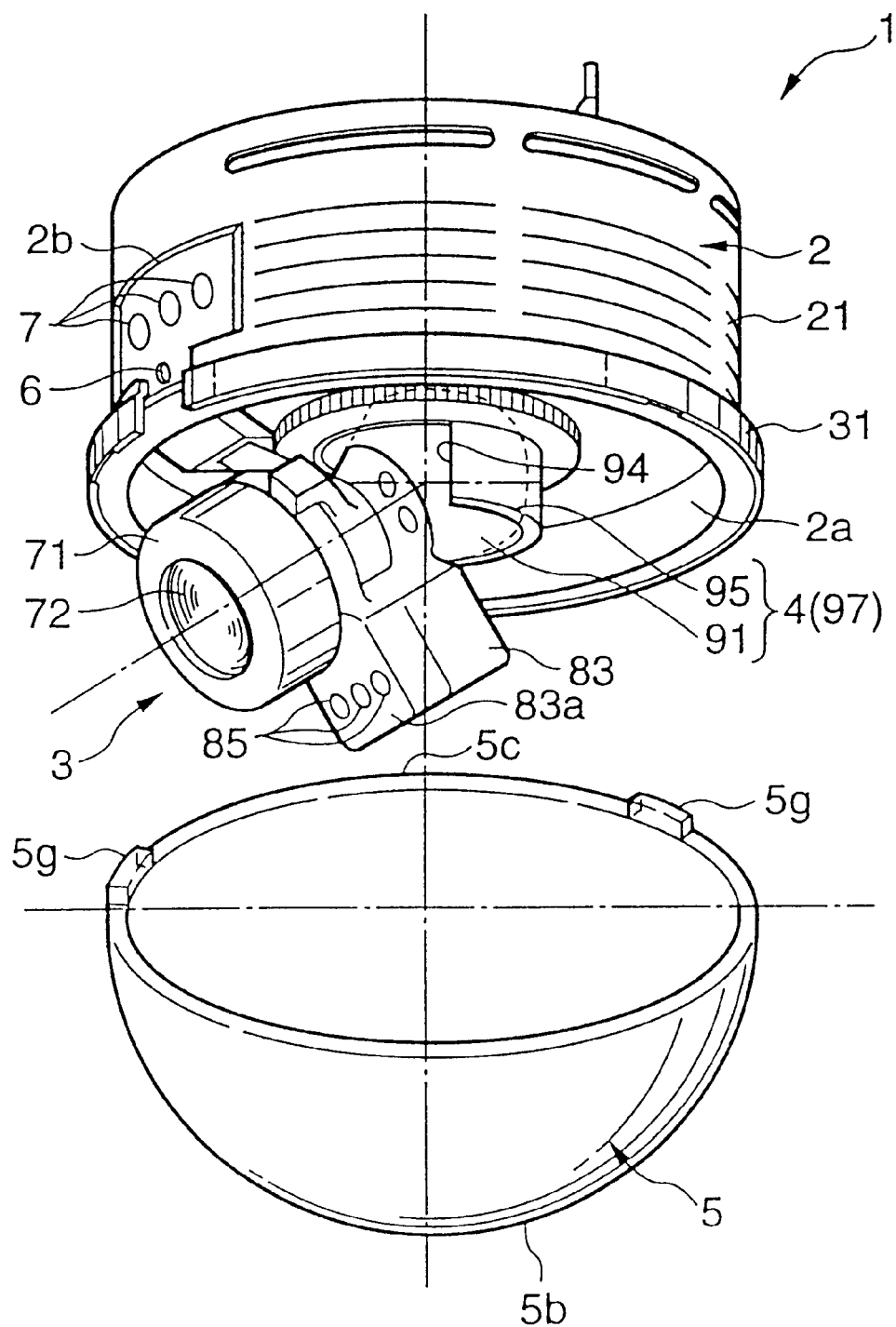
FIG. 2 is a perspective view of the dome-type video camera device when a dome-type cover is separated from a barrel type main body.
Figure 3:
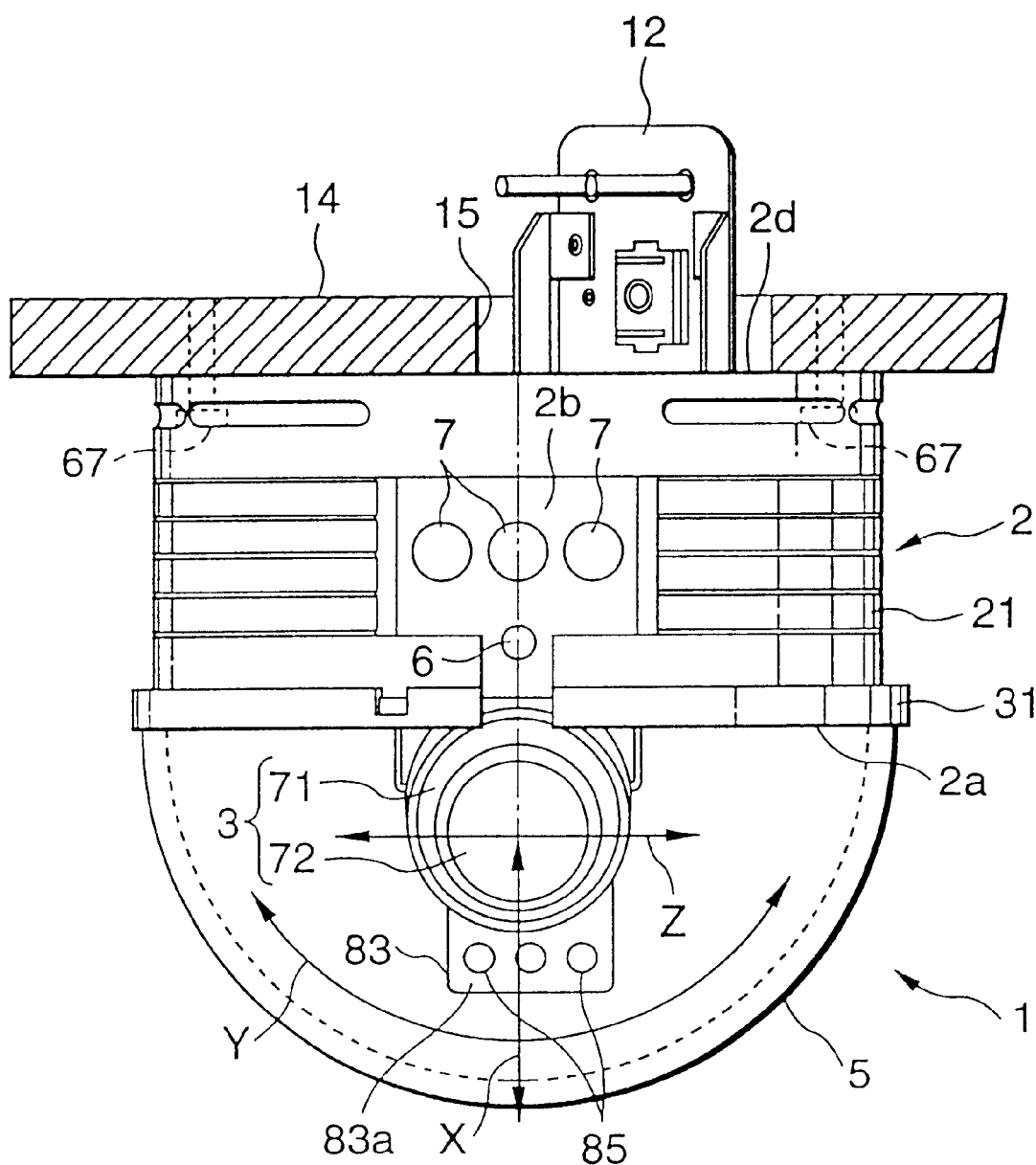
Figure 4:
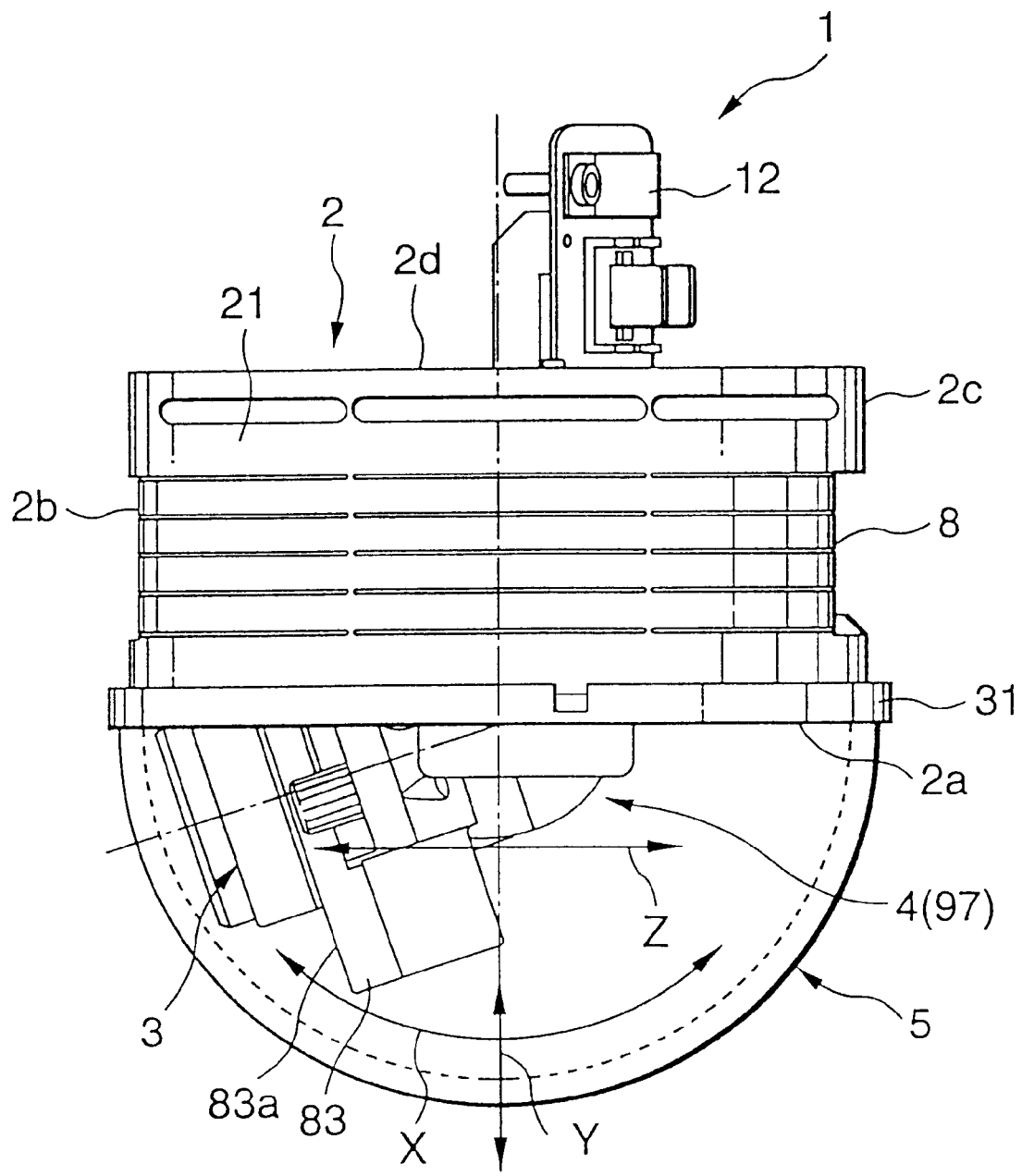
FIG. 4 is a right side view showing the dome-type video camera device.
Figure 5:
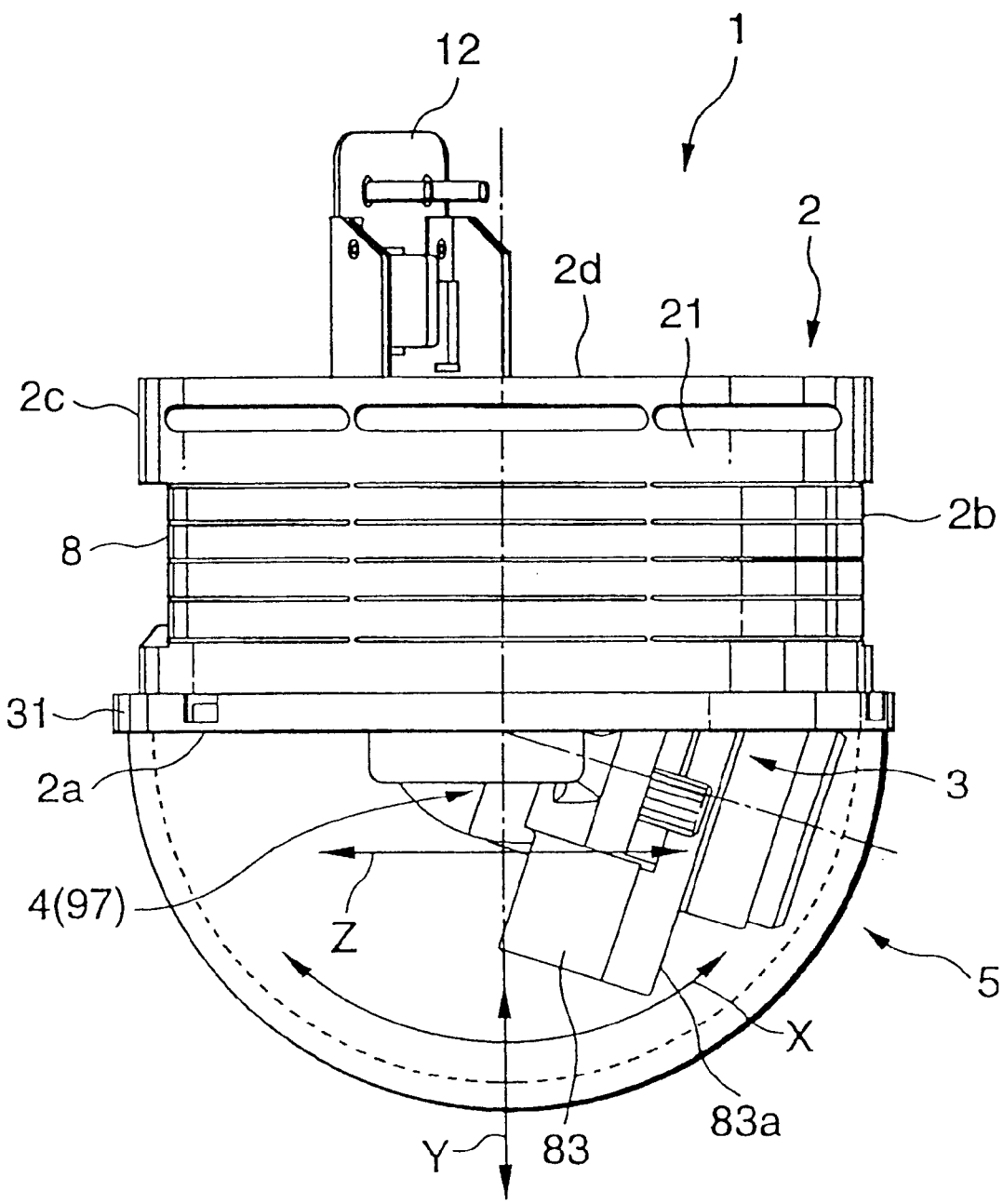
FIG. 5 is a left side view showing the dome-type video camera device.
Figure 6:
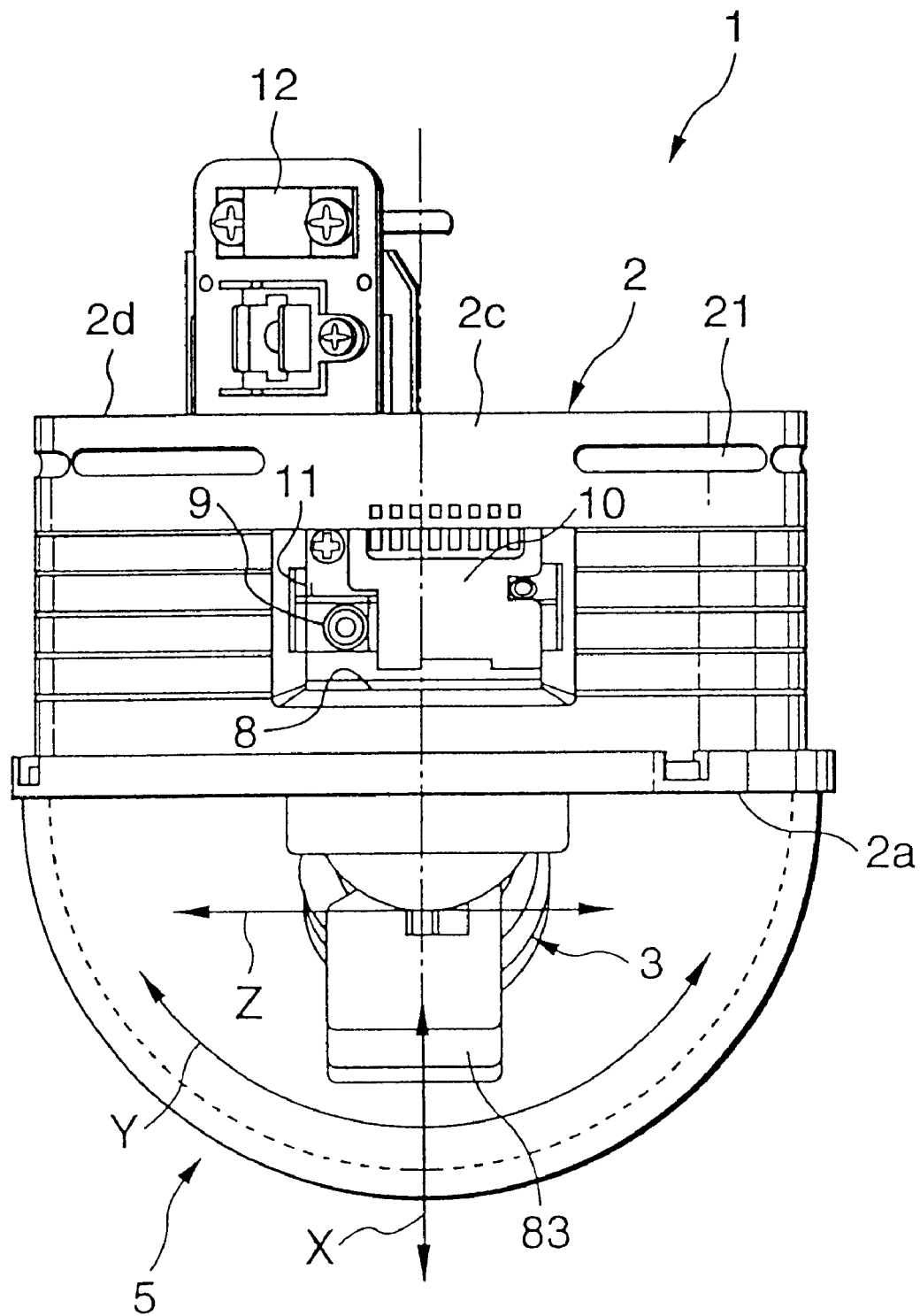
FIG. 6 is a back side view showing the dome-type video camera device.
Figure 7:
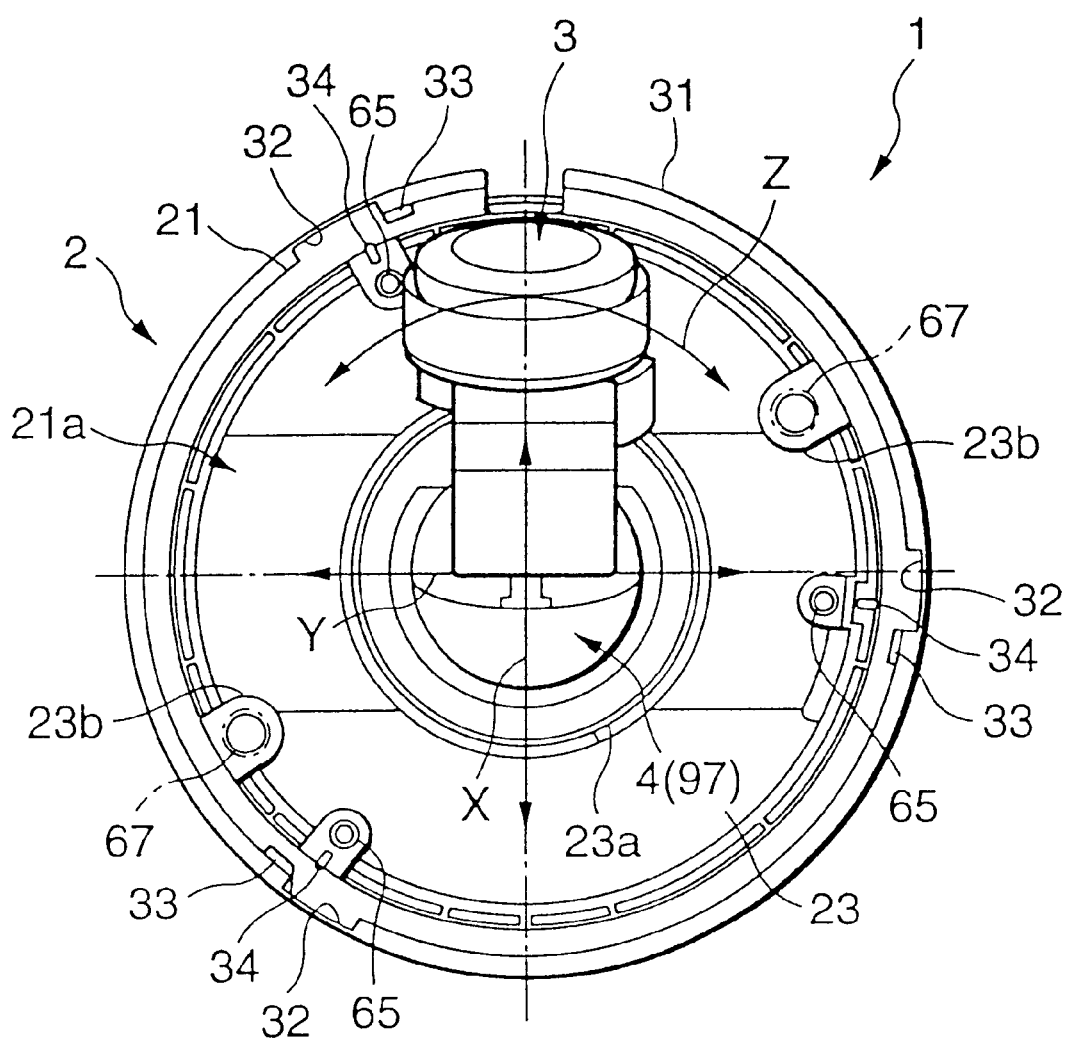
FIG. 7 is a bottom view when the dome-type cover is detached from the dome-type video camera device.
Figure 8:
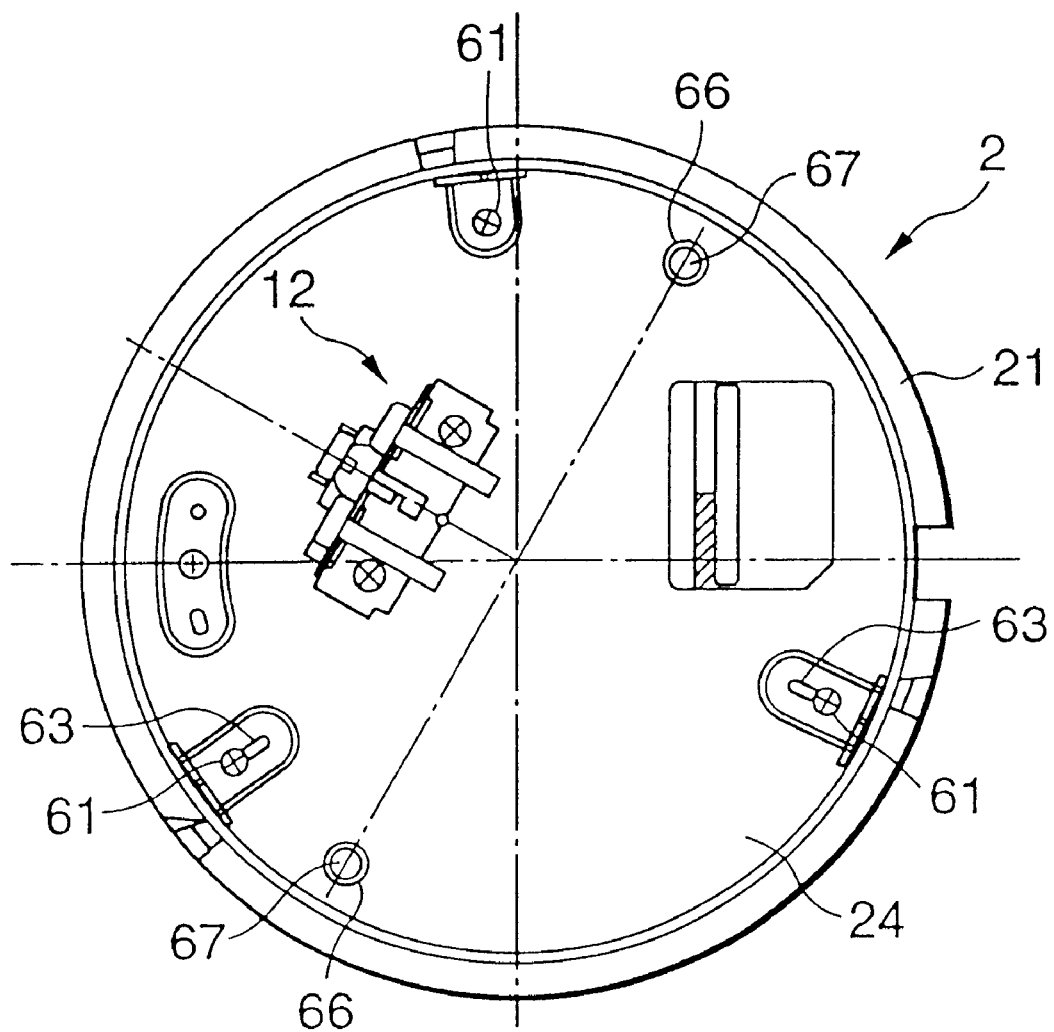
FIG. 8 is a top view showing the dome-type video camera device.

Embodiments of a dome-type video camera device to which the present invention is applied will be described hereunder in the following order with reference to the drawings.

(1) Brief Description of Dome-type Video Camera Device
(2) Description of Barrel type Main Body
(3) Description of Optical Block
(4) Description of Universal Joint Mechanism
(5) Description of Dome-type Cover
(6) Description of Securing Stopper of Universal Joint Mechanism
(7) Description of Installing Work of Dome-type Video Camera Device and of How-to-Use of Monitor Output Terminal at that time
(8) Description of Shaping Device of Dome-type Cover
(9) Description of Applied Example of Video Camera Device (1) Brief Description of Dome-type Video Camera Device First, a dome-type video camera device will be briefly described with reference to FIGS. 1 to 9. A dome-type video camera device 1 which is an example of video camera devices includes a barrel type main body 2, a universal joint mechanism 4 having a single structure which is secured at the front surface side of the barrel type main body 2 and supports an optical block 3 so that the rotation of the optical block 3 in three axial directions is freely adjustable, a dome-type cover 5 which is detachably secured to the front surface 2a of the barrel type main body 2, etc.

The dome-type video camera device 1 is designed so that the diameter D=105 mm or less and the height H=96.6 mm or less, and there can be fabricated a compact and light dome-type video cameral device 1 which is more greatly reduced in size as compared with the above-described conventional dome-type video camera device having a diameter=about 120 mm and height=about 105 mm. A sound collecting microphone 6 is secured to the front face 2b of the side surface of the barrel type main body 2, and a log mark 7 of a manufacturing company name or the like which is a display portion indicating the front face position of the dome-type video camera device 1 is displayed on the front face 2b. Further, a rectangular window 8 is formed in the back face 2c on the side surface of the barrel type main body 2, and a monitor output terminal 9, a monitor image minute adjustment switch 10 and other switches, volumes, etc. are laterally arranged in the window 8. The window 8 is freely closed/opened by a slide type shutter 11 shown in FIG. 9. A coaxial cable terminal 12 serving as a connection portion of a coaxial cable (not shown) connecting to a monitor television in a surveillance room is secured to the back surface 2d of the barrel type main body 2. As show in FIG. 3, when the dome-type video camera device 1 is mounted on the ceiling, wall or the like 14, the coaxial cable terminal 12 is buried in a hole 15 of the ceiling, wall or the like 14. Accordingly, the coaxial cable terminal 12 is not contained in the height H=96.6 mm or less of the dome-type video camera device 1.

The dome-type video cameral device 1 is designed so that the rotational center O of the three axial directions of the universal joint mechanism 4 is one point on the optical axis F of the optical block 3 and disposed on the center of the inner spherical surface 5a of the dome-type cover 5 and the optical block 3 can be subjected to a swing motion (oscillating motion) in the three axial directions, that is, arrow X, Y and Z directions around the rotational center O by the universal joint mechanism 4. Particularly, the maximum rotational angle θ of the optical block 3 in the forward direction with respect to the vertical reference P when the dome-type video camera device 1 is mounted on the ceiling 14 is equal to 72°, and this means that the angle range is set to a very large angle range. The rotational center O of the universal joint mechanism 4 is disposed on the center of the inner spherical surface 5a of the dome-type cover 5, whereby when the rotation of the optical block 3 in the three axial directions is adjusted, the gap G between the lens 301 at the tip of the optical block 3 and the inner spherical surface 5a of the dome-type cover 5 can be kept fixed, and distortion of a pickup image due to variation of the gap G can be prevented.

(2) Description of Barrel Type Main Body

Next, the barrel type main body 2 will be described with reference to FIG. 1, FIGS. 7 to 9 and FIGS. 15 to 20. The barrel type main body 2 includes a barrel type case 21, a main chassis 22 which is the chassis installed in the barrel type case 21, a front-side cover 23, a chassis lid plate 24 which is a back-side chassis, two circuit boards comprising a signal processing board 25 of a double-sided board and a power source board 26, etc. The barrel type case 21 is designed in a cylindrical shape by a mold part (shaped article of ABS resin or the like), and a front-side opening 21a and a back-side (ceiling side) opening 21b are formed at both the ends thereof in the axial direction. A ring-shaped cover fixing portion 31 is integrally formed on the outer periphery of the front-side opening 21a.

A sound collecting hole 35 is laterally formed in the vicinity of the front-side opening 21a inside the front face of the barrel type case 21, and a microphone holder portion 36 is integrally formed in the sound collecting hole 35. Further, a rectangular window 8 is formed in the back surface of the barrel type case 21, and a shutter guide 37 is integrally and arcuately formed along the inner periphery at the back-side opening 21b inside the window 8. There can be fabricated a slide type shutter in which both ends in the barrel type case axial direction of the shutter 11 which is inserted in the barrel type case 21 and shaped arcuately along the inner periphery of the barrel type case 21 are arcuately slid along the inner periphery of the barrel type case 21 while guided by the shutter guide 37 and an arcuate shutter guide 38 which is integrally formed with the front-side cover 23 and will be described later, thereby opening/closing the window 8. Further, two co-joint projections 40 each having an elongated hole 39 designed both as a positioning hole and as a screw-inserting hole, and a co-joint projection 41 having a screw-inserting hole, totally three co-joint projections 40 and 41 are integrally formed at three equi-angular positions on the inner periphery of the back-side opening 21b of the barrel type case 21.

Next, the main chassis 22 is formed of aluminum alloy or other conductive metal by die cast, and integrally constructed by a center ring portion 51, three arm portions 52 and one arm portion 53 which extend radially outwardly from three equi-angular positions on the outer periphery of the center ring portion 51, and two positioning pins 54 and one board mount pin 55 which extend in parallel from the back surfaces of the tips of the three arm portions 52 to the back-side opening 21b side along the axial direction of the barrel type case 21. Totally four board mount tables 56 which are low in height in the axial direction of the barrel type case 21 are integrally formed at and in the vicinity of the tips of the back surfaces of the totally four arm portions 52, 53, and three board mount tables 57 which are high in height in the axial direction of the barrel type case 21 are integrally formed at the outer peripheral side and in the vicinity of the tips of the two positioning pins 54 and at the tip of the board mount pin 55.

The signal processing board 25 is inserted through three positioning holes 58 at the outside thereof into the totally three positioning pins 54 and board mount table 55 and fixed to totally four board mount tables 56 by totally four set screws 59. A power source board 26 is inserted through two positioning holes 60 formed at the outer peripheral side thereof into the tips of the two positioning pins 54, and fixed to totally three board mount tables 57 by totally three set screws 61. As described above, the signal processing board 25 and the power source board 26 which are two circuit boards are installed at two stages in the barrel type case 21, whereby the overall area of the circuit board can be sufficiently increased while the diameter of the barrel type case 21 is reduced. The signal processing board 25 and the power source board 26 are connected to each other by a flexible print board.

At this time, two leaf springs 62 for grounding which are designed to be substantially U-shaped in section are engaged with the two co-joint projections 40 of the barrel type case 21 so that the power source board 26 abuts against the insides of the leaf springs 62 and the chassis lid plate 24 which is formed of a metal plate in the shape of a disc abuts against the outsides of the leaf springs 62. The tips of the two positioning pins 54 are inserted through the elongated holes 39 of the two co-joint projections 40 so as to penetrate through these leaf springs 62, and inserted from the inside into the elongated holes 63 which are two screw insertion holes serving also as the positioning holes on the outer periphery of the chassis lid plate 24. The totally three set screws 61 are inserted from the two elongated holes 63 of the chassis lid plate 24 and the other screw insertion hole 64 on the outer periphery, then inserted through the elongated holes 39 of the totally three co-joint projections 40, 42 and the screw insertion hole 41, and then fixed onto the board mount tables 56, 57 by set screws, whereby the power source board 26, the totally three co-joint projections 40, 41 and the totally two leaf springs 62 are joined to one another so that they are sandwiched between the totally three board mount tables 56, 57 and the chassis lid plate 24. Accordingly, the signal processing board 25 and the power source board 26 are installed in two stages (stepwise) in the axial direction in the barrel type case 21 and vertically to the axial direction, and the back-side opening 21*b* of the barrel type case 21 is closed by the chassis lid plate 24. The signal processing board 25 and the power source board 26 are grounded to the chassis lid plate 24 through the conductive main chassis 22 and two leaf springs 62.

The sound collecting microphone 6 is connected to the front surface side of the signal processing board 25 through a lead wire 6*a* and a connector, and detachably held in a lateral direction in the microphone holder 36 of the barrel type case 21. The monitor output terminal 9 is mounted (soldering-dipped) at the outer peripheral position of the front surface side of the signal processing board 25 in parallel to the mount face of the signal processing board 25, and disposed in the window 8. The monitor image minute adjustment switch 10, etc. are secured to the switch stand 10*a* fixed to the front surface side of the chassis lid plate 24 and disposed in the window 8. The coaxial cable terminal 12 is secured to the back surface (outer surface) of the chassis lid plate 24.

(3) Description of Optical Block

Next, the optical block 3 will be described with reference to FIG. 1 and FIGS. 9 to 14. A lens 72 such as a variable focal lense comprising an assembly of plural lenses is accommodated in the tip end 71*a* of the mirror barrel 71 formed of a mold part, and a spherical portion 91 of a universal joint mechanism 4 described later is detachably linked on the optical axis F of the lens 72 at the base end 71*b*. The spherical portion 91 is designed to have a spherical surface 91*a* on the outer periphery thereof and a hollow portion 91*b* therein. A CCD unit 74 is installed on the optical axis F in the hollow portion 91*b* of the spherical portion 91. The CCD unit 74 comprises a CCD 75 serving as an image pickup device, a CCD holder 76, a CCD board 77, an optical low pass filter 78, a seal rubber 79, etc., and is fit in the lens holder 101 of the spherical portion 91 described later by two set screws 80. A focus ring 81 and a zoom lens 82 are secured to the outer periphery at the top end 71*a* side of the mirror barrel 71. A convex portion 83 is integrally formed with the outer peripheral portion at the base end 71*b* side of the mirror barrel 71, and an automatic iris motor 84 is installed in the convex portion 83. A log mark 85 such as a manufacturing company name or the like which is a display portion to display the heaven-and-earth direction of a monitor image is displayed at the front surface 83*a* of the convex portion 83. A signal cable 87 serving as a harness drawn out from a connector 86 secured to the center (on the optical axis F) of the back surface of the CCD board 77 of the CCD unit 74 and a signal cable 89 serving as a harness drawn out from a connector 88 of the automatic iris motor 84 are inserted through the center of the spherical portion 91 and drawn out to the back side (main chassis 24).

(4) Description of Universal Joint Mechanism

The universal joint mechanism 4 will be described with reference to FIGS. 9 to 14. The universal joint mechanism 4 is constructed by a ball joint mechanism 97 comprising a spherical portion 91 which is fixed to the base end 71*b* of the mirror barrel 71 by screws, a barrel type base table 92 which is integrally formed coaxially and cylindrically at the front surface side of the center ring portion 22*a* of the main chassis 22, a spherical portion support table 93 which is the tip on the inner peripheral surface of the barrel type base table 92, an angle adjustment ring 95 which is formed of a die-cast part such as aluminum alloy or the like and has an angle adjusting notch 94 formed at a part of the outer periphery thereof, and a joint ring 96 for joining the spherical portion 91 to the spherical portion support table 93 through the angle adjusting ring 95 under press. The spherical portion 91 is designed in such a bisectional structure that it is divided into a hollow lens holder 101 formed of a metal casting part and a holder cover 102 in the direction of the optical axis F. The lens holder 101 and the holder cover 102 are mutually engaged with each other from the direction of the optical axis F at the annular engagement portion 103 portion formed on the divisional surface, and detachably linked to each other by two set screws 104. The spherical portion 91 is constructed by the two parts of the lens holder 101 and the holder cover 102, and these parts are detachably joined to each other by two set screws 104, thereby facilitating fabrication and decomposition of the CCD unit 74 in the hollow portion 91*b*. The diameter of the spherical portion support table 93 and the inner diameter of the inner peripheral flange 95*a* integrally formed with the inner periphery of the front end side of the angle adjusting ring 95 are set to be smaller than the diameter of the spherical surface 91*a* of the outer periphery of the spherical portion 91. Further, an inner peripheral screw (female screw) 105 is formed on the inner periphery of the joint ring 96, and an outer peripheral screw (male screw) 107 is formed on the outer periphery of the cylindrical portion 106 which is integrally formed in a coaxial and cylindrical shape at the outer peripheral position of the barrel type base stand 92 and at the front side of the center ring portion 51 of the main chassis 22.

The inner peripheral screw 104 of the joint ring 96 is threaded into the outer peripheral screw 107 of the main chassis 22 and fastened in the direction of an arrow a corresponding to a backward direction, whereby an outer peripheral flange 95*b* integrally formed with the outer periphery of the rear end side of the angle adjusting ring 95 is pushed in the direction of the arrow a by an inner peripheral flange 96*a* integrally formed with the inner periphery of the front end side of the joint ring 96. Accordingly, the inner peripheral flange 95*a* of the angle adjusting ring 95 pushes the outer periphery (spherical surface 91*a*) of the lens holder 101 of the spherical portion 91 in the direction of the arrow a, and the outer periphery (spherical surface 91*a*) of the holder cover 102 of the spherical portion 91 is pressed and fixed to the spherical portion support table 93 from the direction of the arrow a. The center of the spherical surface 91*a* of the spherical portion 91 is fixed to the rotational center O disposed on the center of the inner spherical surface 5a of the dome-type cover 5 on the optical axis F under the joint state of the ball joint mechanism 97 by the joint ring 96.

According to the ball joint mechanism 97, by slightly loosening the joint ring 96 in the direction of an arrow b which corresponds to the forward direction, the mirror barrel 71 is subjected to the swing motion (oscillating motion) at 360° in the three axial directions of arrows X, Y, Z around the rotational center O so that the spherical surface 91a on the outer periphery of the spherical portion 91 is slid on the spherical portion support table 93. The arrow X direction corresponds to a pan direction, the arrow Y direction corresponds to a tilt direction and the arrow Z direction corresponds to a swing direction. When the mirror barrel 71 is subjected to the angle adjustment in the arrow X direction, the mirror barrel 71 is inserted into the notch 94 of the angle adjustment ring 95, whereby the adjustment angle θ in the arrow X direction of the mirror barrel 71 can be set to a large angle of 72°.

The two signal cables 87, 89 drawn out to the back side of the mirror barrel 71 are drawn out from a circular hole 108 formed at the center of the rear end side of the holder cover 102 to the back side thereof, and are connected to two connectors 109, 110 which are mounted at the center of the front surface of the signal processing board 25 and disposed at the center in the barrel type base table 92 while keeping the length of each cable to be surplus. Accordingly, any breaking of these signal cables 87 and 89 due to distortion or the like does not occur not only when the mirror barrel 71 is subjected to the angle adjustment in the arrow X, Y directions, but also when the angle adjustment of about one rotation in the arrow Z direction is carried out.

As shown in FIGS. 10 to 13, the joint faces between the base end 71b of the mirror barrel 71 and the lens holder 101 serving as the side surface of the front side of the spherical portion 91 are constructed as taper surfaces 115, 116 along the spherical surface 91a of the spherical portion 91, and the base end 71b and the lens holder 101 are detachably joined to the taper surfaces 115, 116 by totally four set screws 117 serving as joint screws. In addition, in this case, the totally four set screws 117 are inserted vertically to the taper surfaces 115, 116 to be inclined along the radial screw central line P1 intersecting to one point O1 on the optical axis F. Accordingly, the diameter of the joint portion (so-called root portion of the spherical portion 91) 118 between the base end 71a of the mirror barrel 71 and the spherical portion 91 can be sufficiently reduced, so that the diameter of the spherical portion 91 itself can be sufficiently reduced and thus the overall size of the ball joint mechanism 97 can be reduced. In addition, the adjustment angle of the mirror barrel 71 can be increased. That is, when the joint face between the base end 71b and the lens holder 101 is formed vertically to the optical axis F, and the base end 71b and the lens holder 101 are joined to each other by four screws 117 which are parallel to the optical axis F, it is necessary to form a flange on the outer periphery of the base end 71b, and thus the diameter of the joint portion 118 is increased. When the diameter of the joint portion 118 is increased, the joint portion 118 interferes with the angle adjustment ring 95 when the angle adjustment of the mirror barrel 71 is carried out, and the adjustment angle is restricted, so that it is unavoidably required to increase the diameter of the spherical portion 91 and thus the overall size of the ball joint mechanism 97 is increased.

The base end 71b and the lens holder 101 are joined to each other at the taper surface 115, 116 portions by totally four set screws 117 which are joined along the radial screw center line P1, whereby uniform joint force can be produced around the optical axis F and the centering between the CCD 75 and the optical axis F of the lens 72 can be surely performed by the automatic adjustment action by the taper surfaces 115, 116. In addition, the parallel degree between the imaging face of the CCD 75 and the focusing plane of the lens 72 can be set with high precision. A positioning portion 119 for setting the heave-and-earth direction of the CCD 75 is formed between both the taper surfaces 115, 116, and the base end 71b and the lens holder 101 can be joined to each other with being surely positioned at one point on the circumference.

Figure 11:
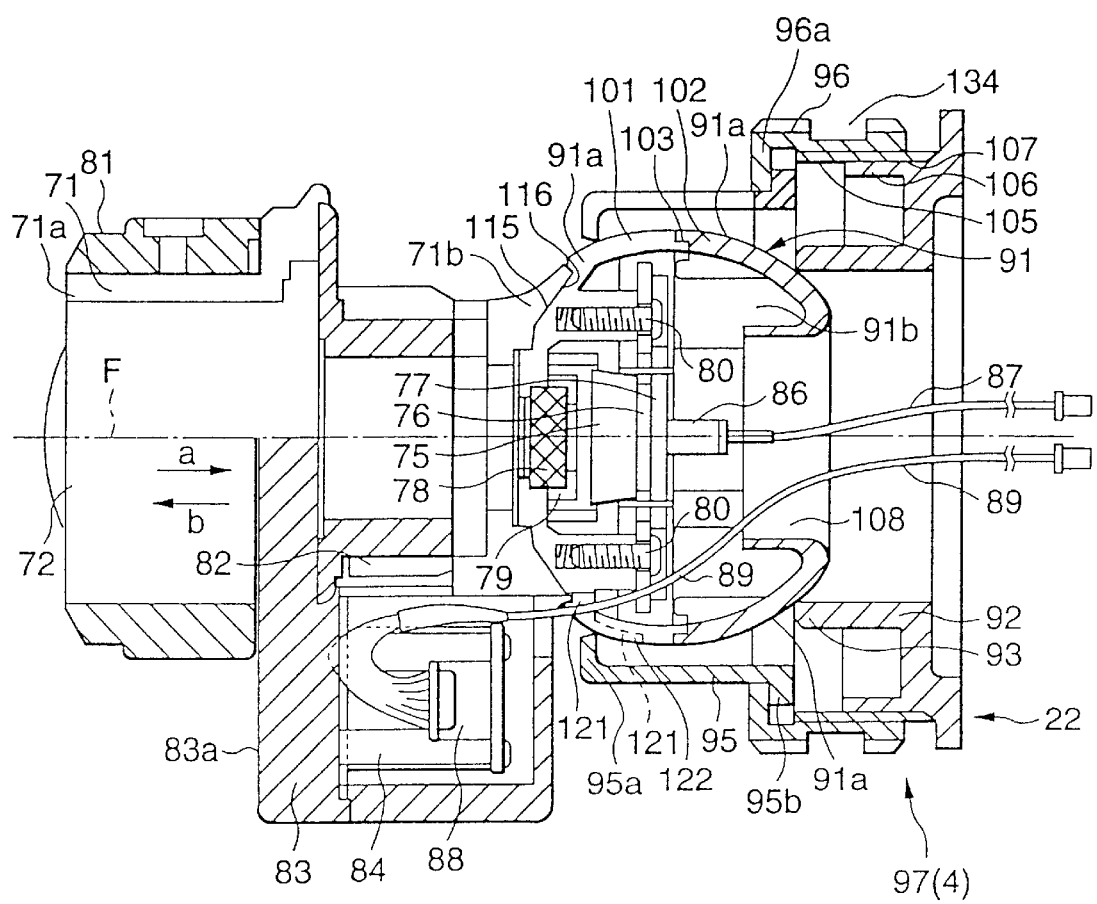
FIG. 11 is an enlarged sectional view taken along an arrow B—B of FIG. 13 showing the universal joint mechanism (ball joint mechanism) portion in the dome-type video camera device.
Figure 13B:
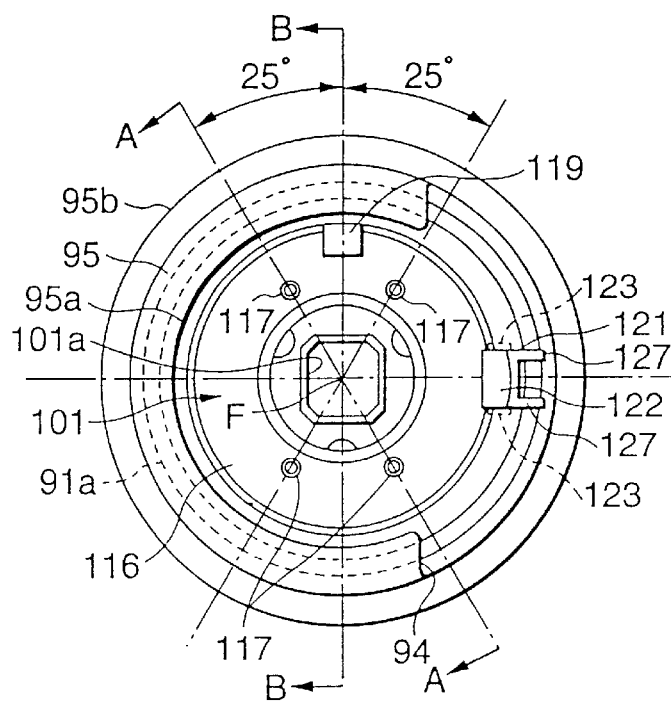
FIG. 13 is a front view and a side view showing the spherical portion of the optical block in the dome-type video camera device.
Figure 13A:
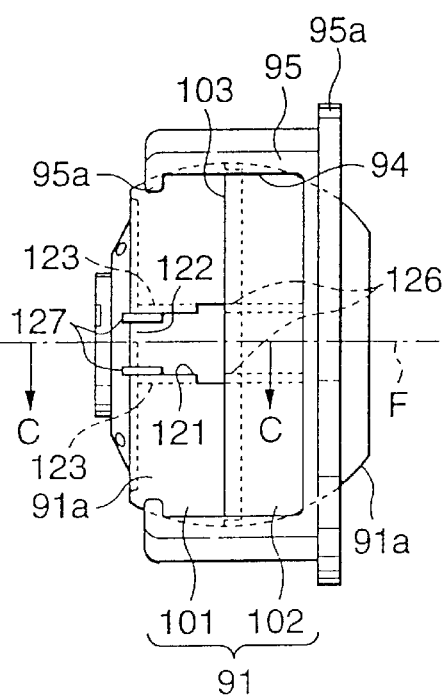
Figure 14A:
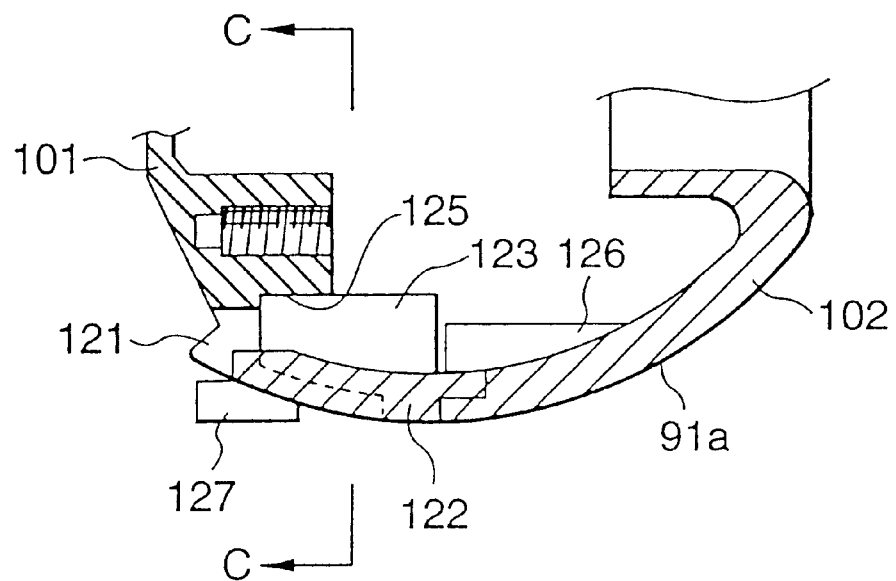
FIG. 14 is an enlarged sectional view taken along an arrow C—C and a sectional view taken along an arrow D—D of FIG. 13 showing the structure of a signal cable insertion notch portion of an automatic iris motor in the dome-type video camera device.
Figure 14B:
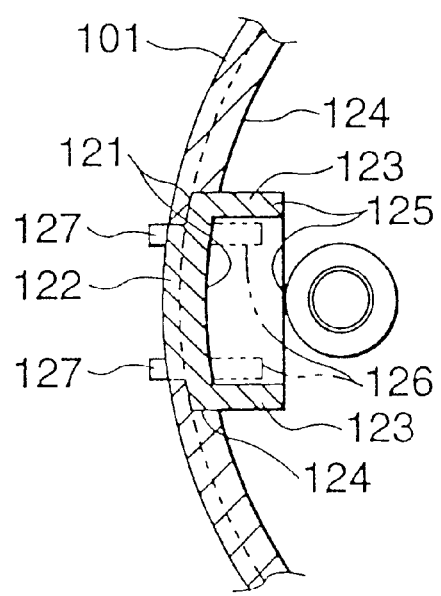
Figure 15:
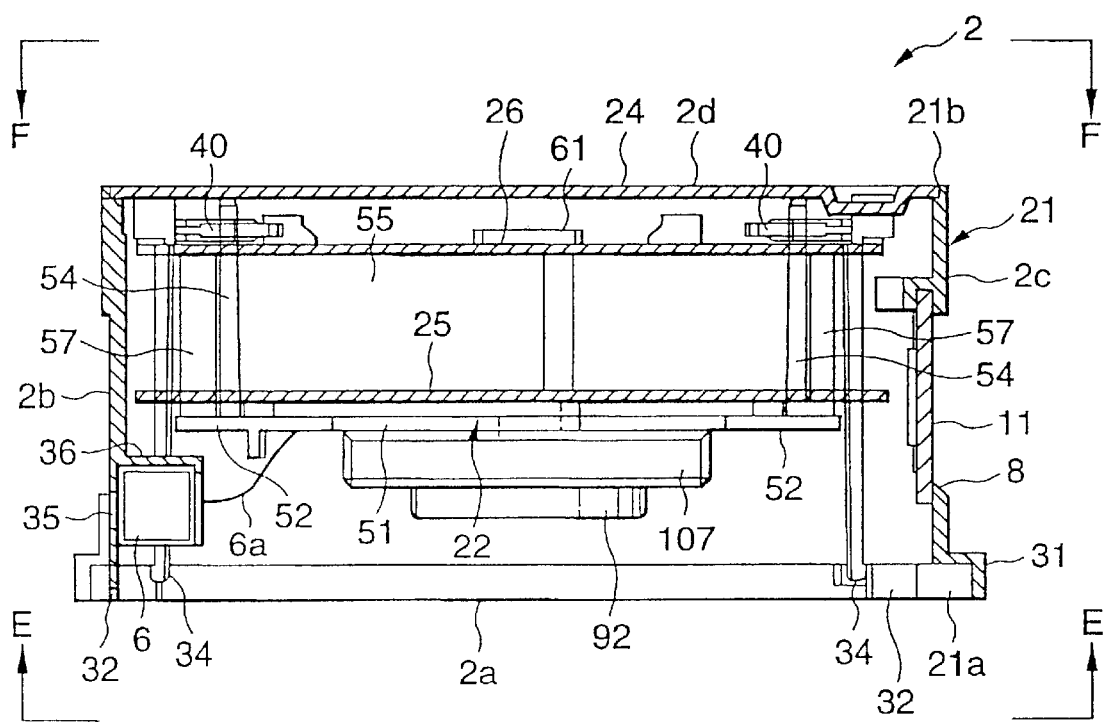
FIG. 15 is a longitudinal-sectional view of the barrel type main body of the dome-type video camera device.
Figure 16:
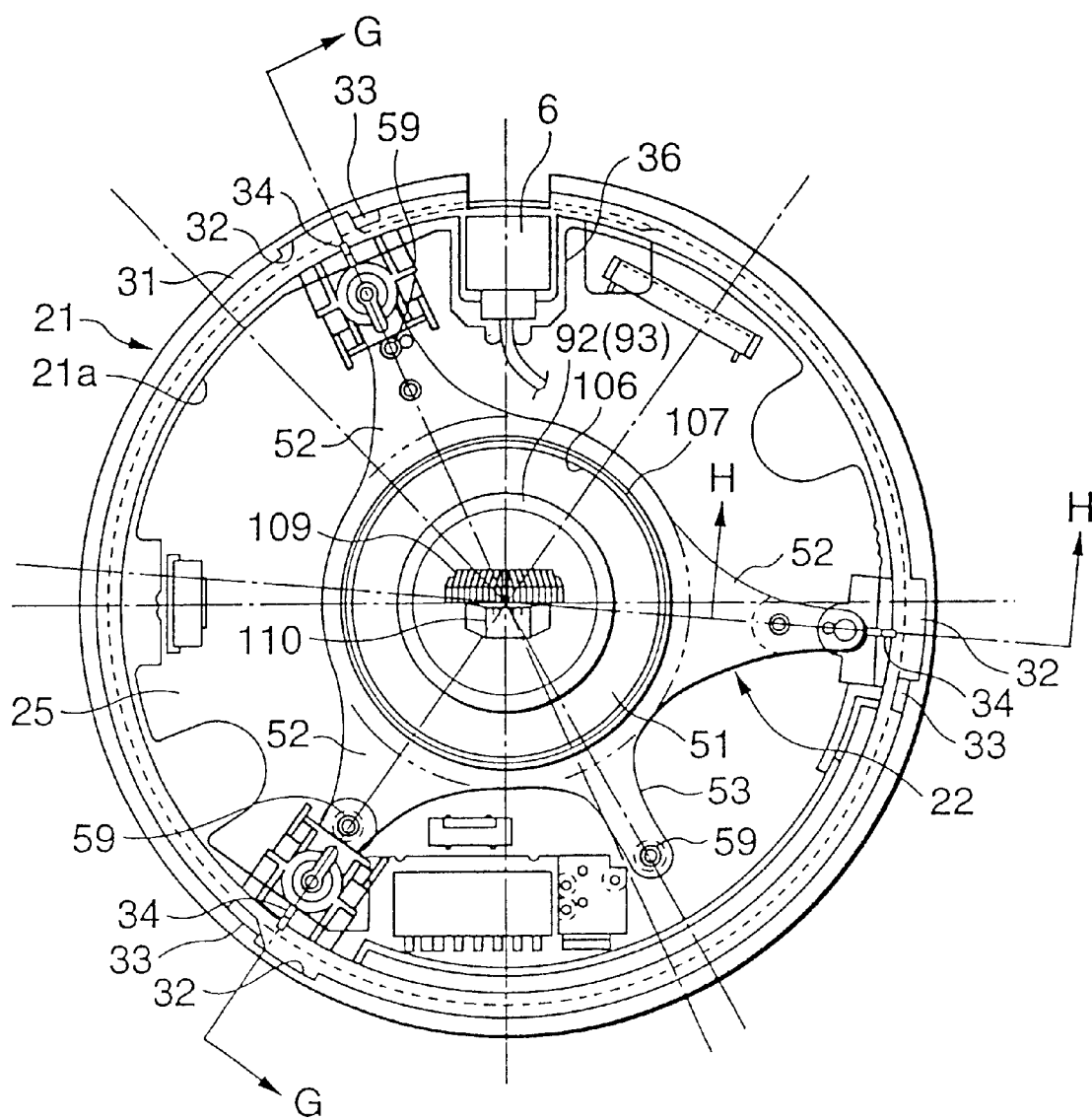
FIG. 16 is a front view taken along an arrow E–E of FIG. 15 showing the front surface side of the barrel type main body.
Figure 17:
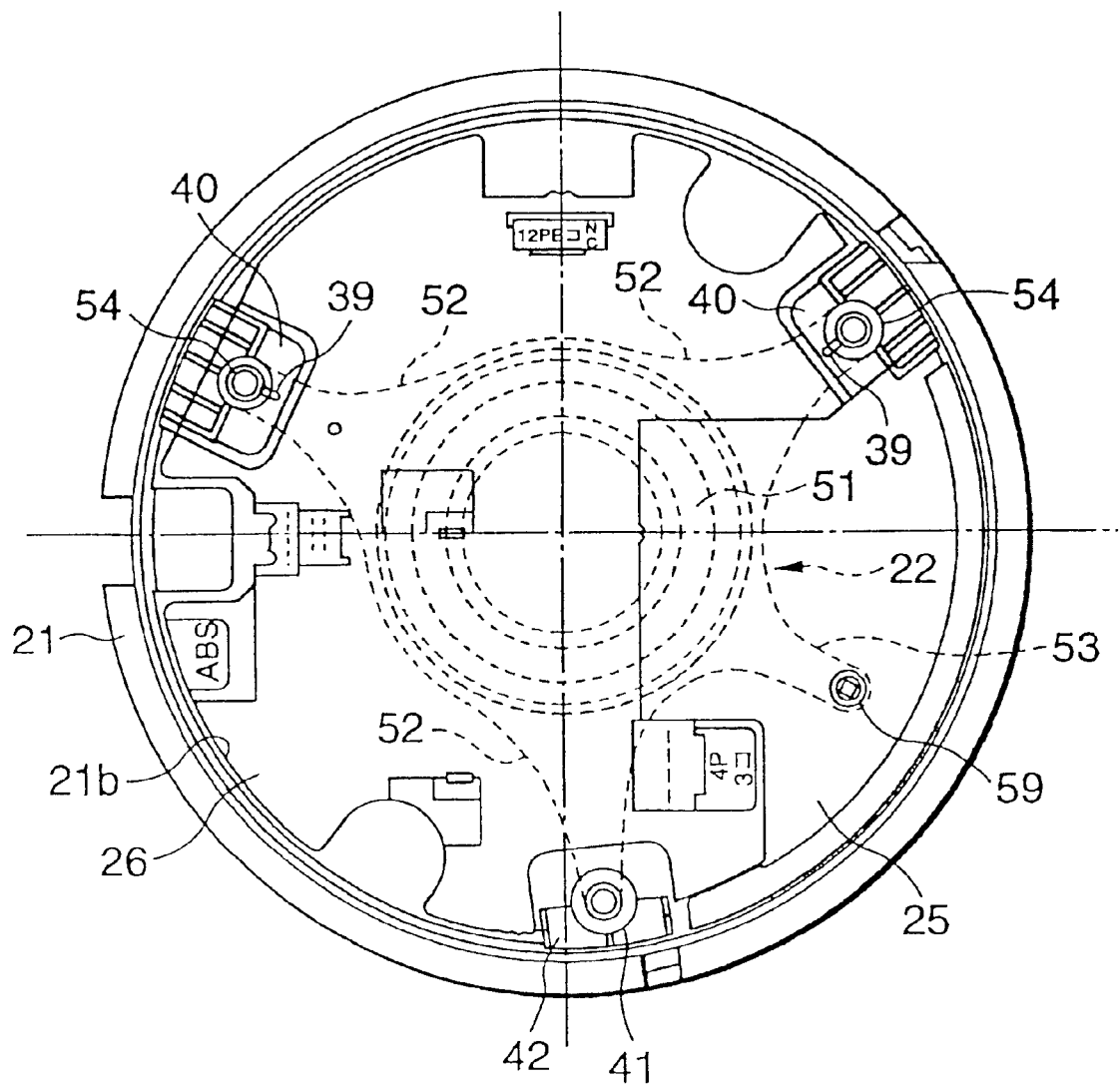
FIG. 17 is a back side view taken along an arrow F—F of FIG. 15 showing the back surface side of the barrel type main body, and is a diagram showing a state where a chassis lid plate is detached.
Figure 18:
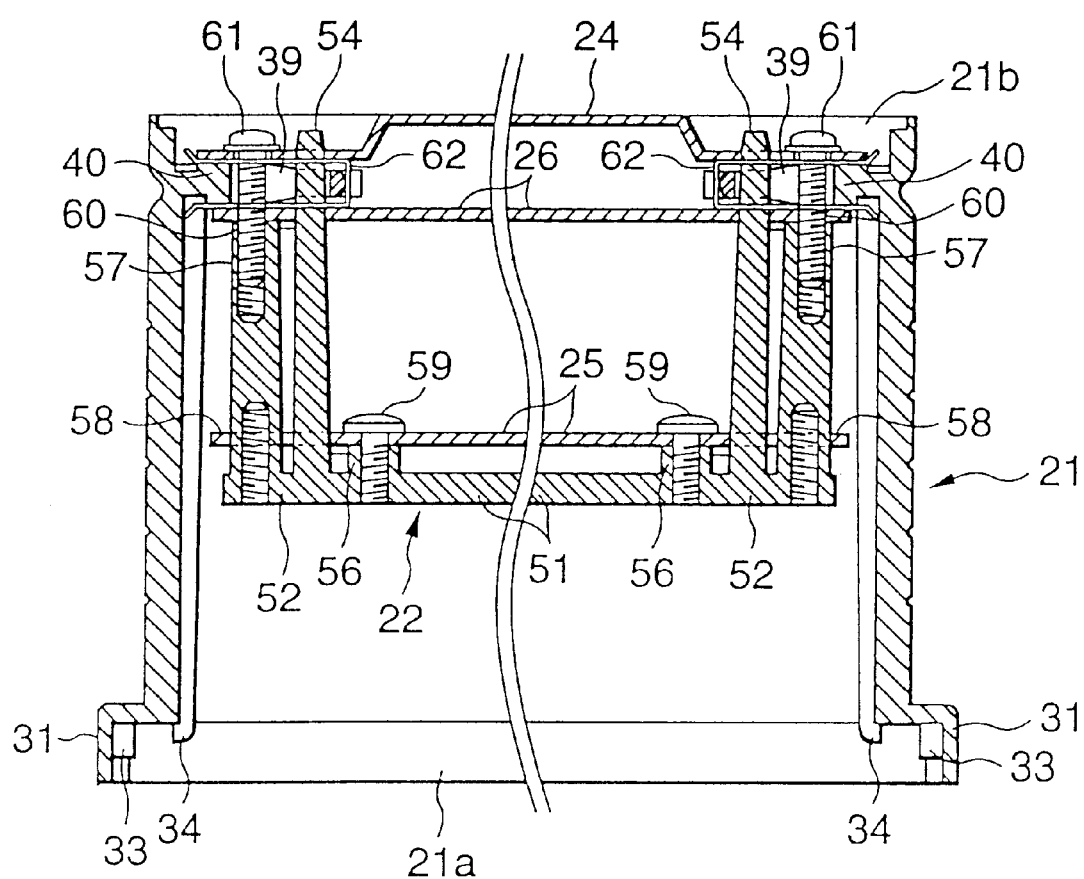
FIG. 18 is a cross-sectional view taken along an arrow G—G of FIG. 16 in the barrel type main body.
Figure 19:
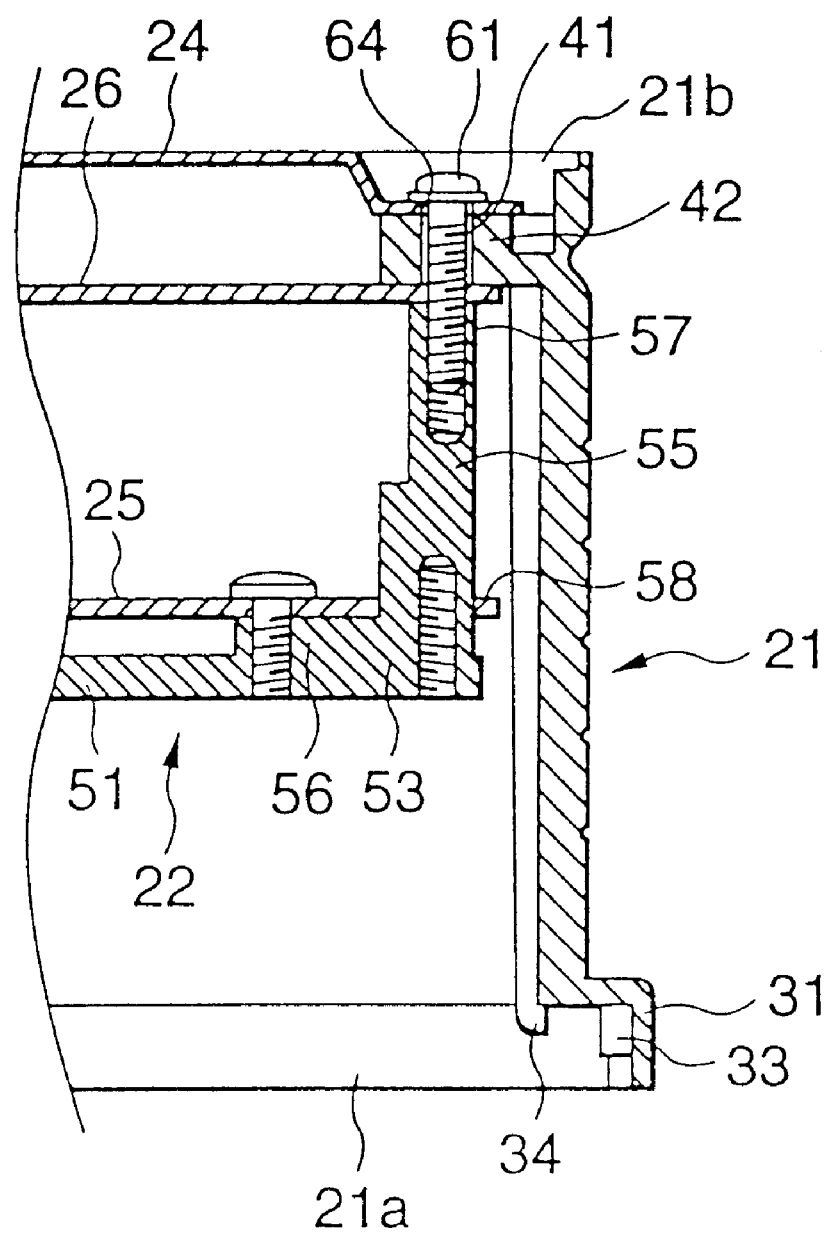
FIG. 19 is a cross-sectional view taken along an arrow H—H of FIG. 16 in the barrel type main body.
Figure 20:
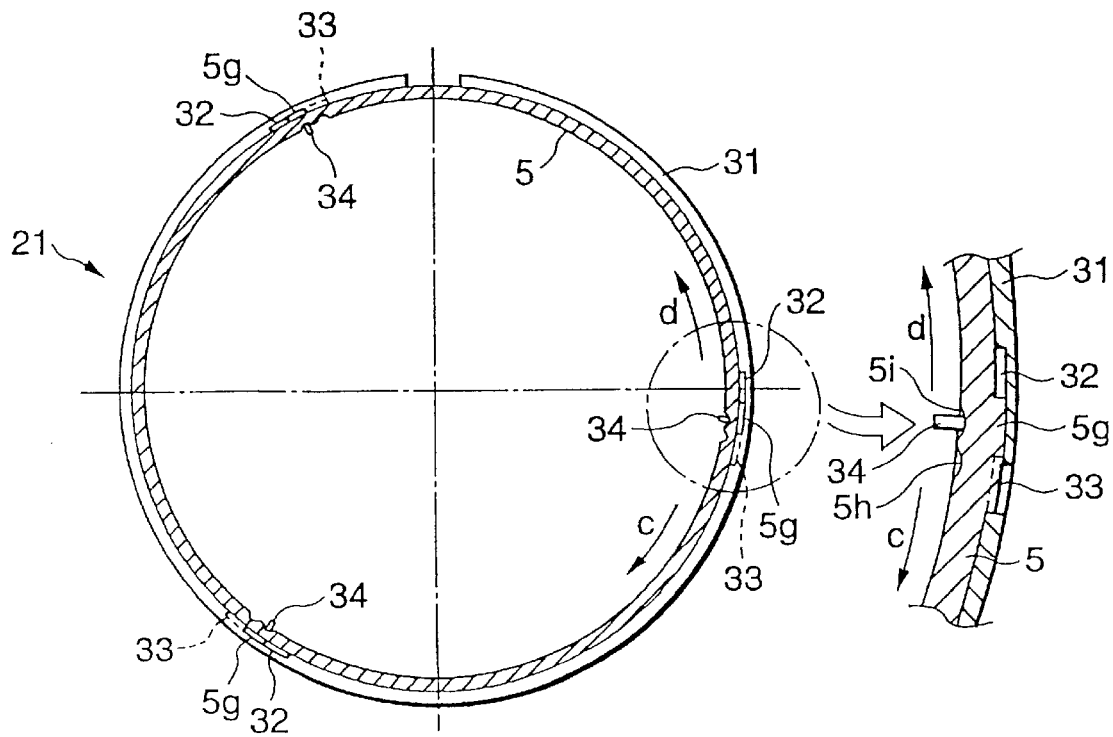
FIG. 20 is a partially-notched front view showing the securing portion of the dome-type cover to the barrel type main body in the dome-type video camera device.

As shown in FIG. 11, FIG. 13 and FIG. 14, a notch 121 through a signal cable 89 drawn out from the automatic iris motor 84 is inserted into the spherical portion 91 is formed on the outer periphery of the taper surface 113 of the lens holder 101 and in the vicinity of the back side of the automatic iris motor 84, and a lid 122 is detachably mounted at the outside area of the notch 121. The lid 122 can be detachably secured into the notch 121 without using any screw by engagedly inserting from the arrow b direction a pair of inside ribs 123 integrally formed parallel at both the sides of the inner side of the lid 122 into a pair of groove portions 125 formed at both the sides of the inner side of the notch 121 of the lens holder 101 and a recess portion 125 formed between the inner sides of the pair of groove portions 125, and then fitting to the inside of the rear end of the lid 122 the tip end of a pair of inner ribs 126 integrally formed at the inside of the holder cover 102 which is engaged with the rear portion of the lens holder 101 from the arrow b direction by an annular engagement portion 103 and joined by two set screws 104. A pair of convex portion 127 are integrally formed at both sides of the front end side of the outer periphery of the lid 122. Accordingly, the outside of the signal cable 89 inserted into the notch 121 can be covered by the lid 122, and even when the edge portion of the notch 94 of the angle adjustment ring 95 interferes with the outer periphery of the lid 122 at the time of the rotation and the angle adjustment of the mirror barrel 71, the convex portion 127 of the outer periphery of the lid 122 impinges against the edge portion of the notch 94 faster than the signal cable 89 and thus escaped. Therefore, the signal cable 89 can be beforehand prevented from being hitched and broken at the edge portion of the notch 94, and thus high safety can be ensured.

(5) Description of Dome-type Cover

Next, the dome-type cover 5 will be described with reference to FIGS. 27 to 29. The dome-type cover 5 is formed by a mold part having a light transmissible property (injection-molded part of acrylic resin), and designed as a dome structure (semi-spherical) having a diameter of the opening edge 5c D11=100.2 mm and a height H11=52.8 mm. The radius R1 of the inner spherical surface 5a of the dome-type cover 5 is set to 47.1 mm, and the radius R2 of the outer spherical surface 5b is set to 49.0 mm. The center O11 of the inner spherical surface 5a is offset to the outside of the opening edge 5c with respect to the center O12 of the outer spherical surface 5b by an offset amount OS of about 0.5 mm. Accordingly, the dome-type cover 5 is designed so that the thickness T11 of the opening edge 5c portion is equal to about 1.9 mm and the thickness T12 of the center portion (top portion) 5d portion is equal to about 2.4 mm. Further, a thickness-varied portion 5e is formed along the overall periphery of the opening edge 5c portion so as to have a height H12=about 8.8 mm. The thickness-varied portion 5e is constructed by many recesses 5f each having a width W11=about 8 mm, a depth D11=about 0.8 mm and a pitch angle θ11=about 15°. An area indicated by two-dotted chain heavy line as shown in FIG. 27 is constructed as an optical effective portion 5f.

The reason why the dome-type cover 5 is formed of acrylic resin by injection molding is that acrylic resin has an light refractivity of 1.5 which is near to that of an optical lens and also a light transmittance of 90% or more. The dome-type cover 5 is formed of acrylic resin by injection molding, thereby enhancing the forming efficiency and achieving highly-precise mirror surface finishing. However, since the dome-type video camera device 1 does not aim at intimidation and is used for surveillance while people do not pay their attention thereto, it is preferable that the optical block 3 is finished as being semi-transparent so as to be inconspicuous. Therefore, generally, when the dome-type cover 5 is formed of acrylic resin by injection molding, it is frequently contaminated with carbon material to achieve a smoke finishing for adjustment of the light transmittance. However, there is a so-called half-mirror finishing which is an antireflection coating obtained by coating metal powder of aluminum or the like on the surface of the outer spherical surface 5b of the dome-type cover 5, and transmittance, reflectivity and absorbency in this case are generally set to about 33%. The antireflection coating based on metal powder also serves as charge-preventing coating, and adhesion of dust due to electrostatic charging can be prevented.

Figure 27:
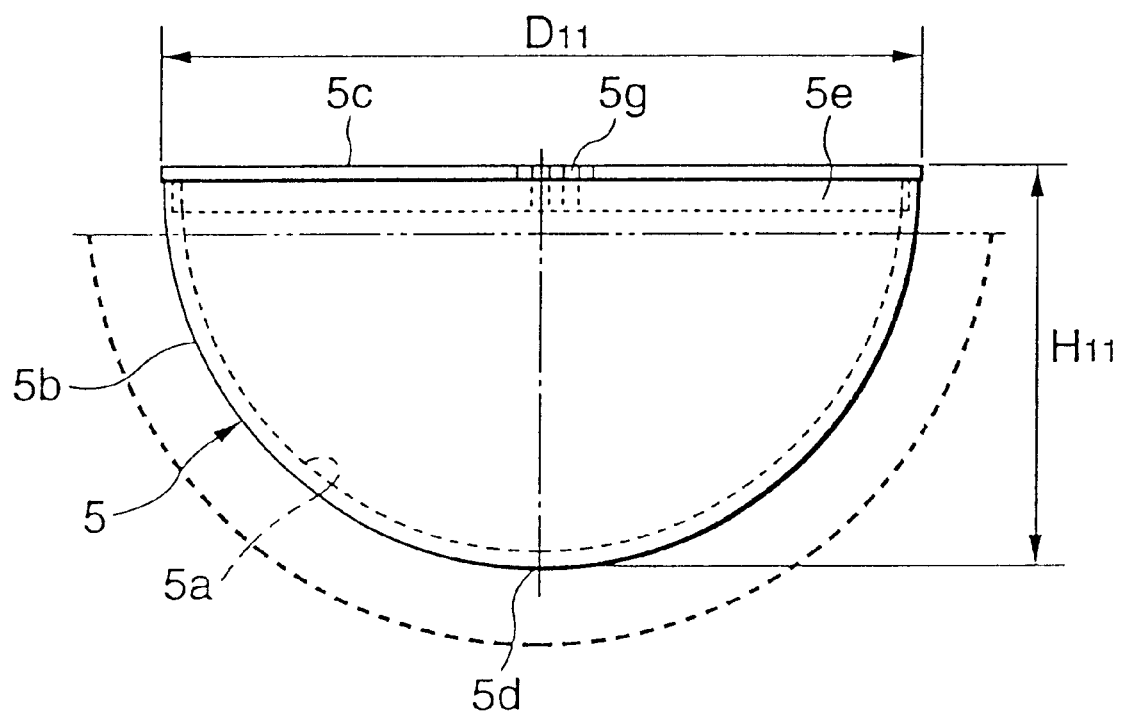
FIG. 27 is a side view showing the dome-type cover in the dome-type video camera device.
Figure 28:
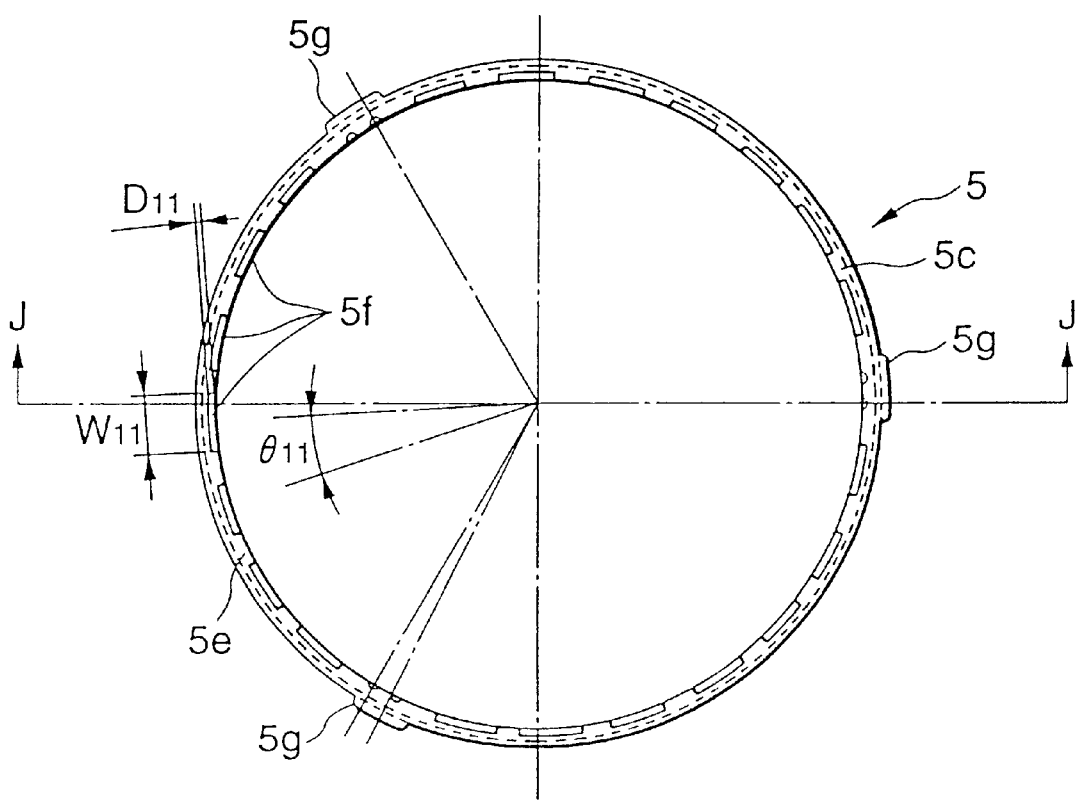
FIG. 28 is a top view showing the dome-type cover.
Figure 29:
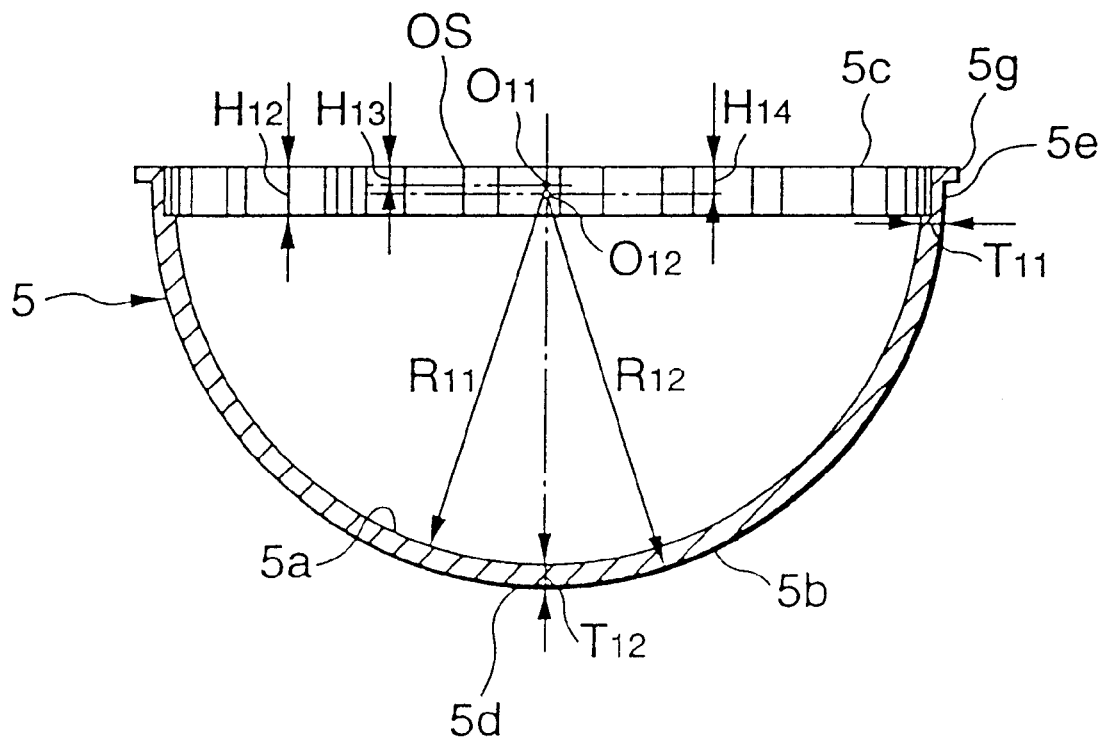
FIG. 29 is a cross-sectional view taken along an arrow J—J of FIG. 28 showing the dome-type cover.
Figure 30:
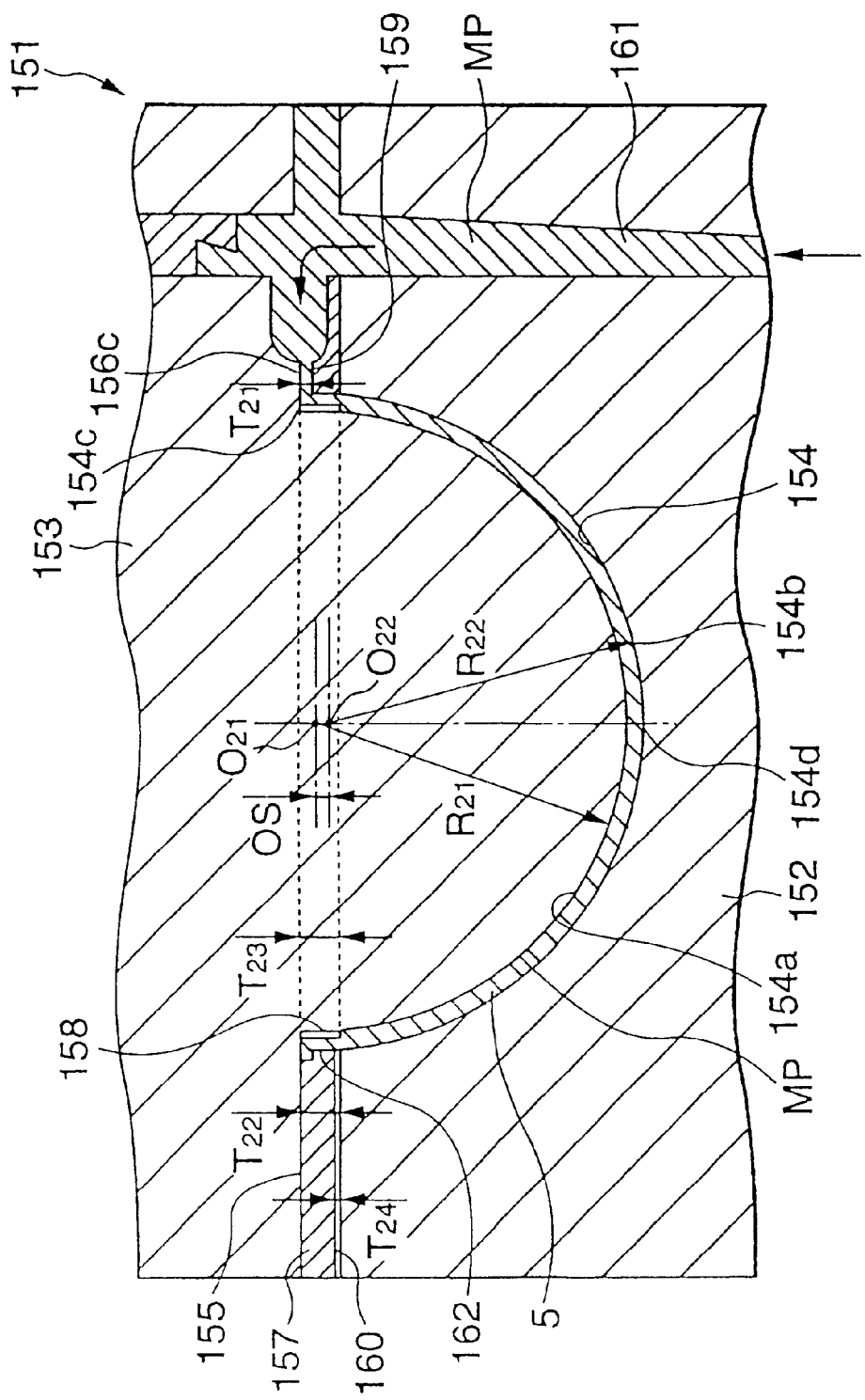
FIG. 30 is a longitudinal-sectional view showing an injection molding apparatus of a dome-type cover.
Figure 31:
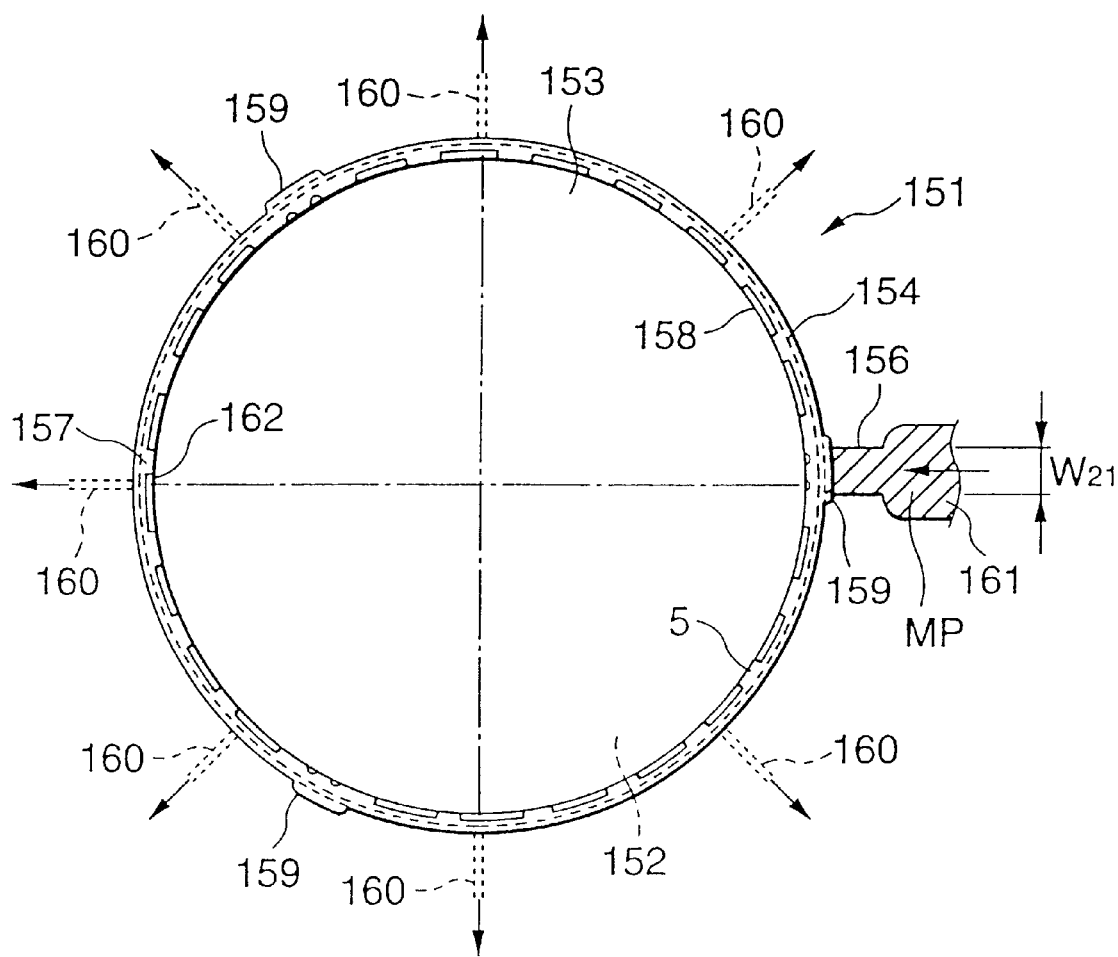
FIG. 31 is a top view showing the injection molding apparatus.
Figure 32A:
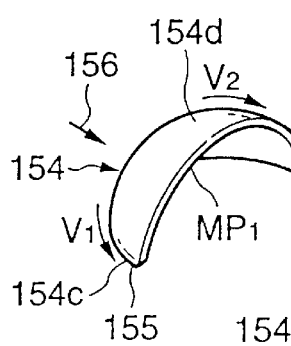
FIG. 32 is a perspective view showing a gas vent action in an injection molding process of a dome-type cover by the injection molding apparatus.
Figure 32B:
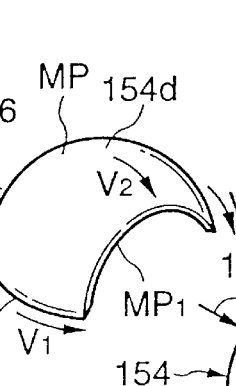
Figure 32C:
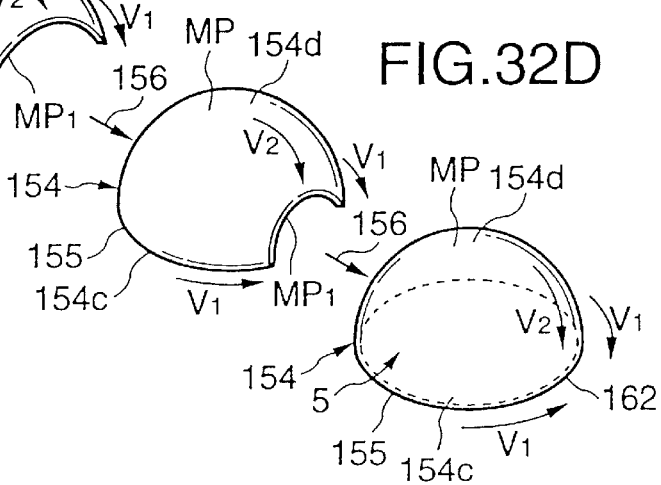
Figure 32D:
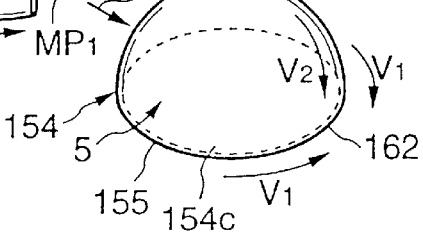

In order to detachably install the dome-type cover 5 to the front surface 2a of the barrel type main body 2, three projecting pieces 5g are integrally formed at three equi-angular positions on the outer periphery of the opening edge 5c of the dome-type cover 5 as shown in FIGS. 27 to 29, and respective pairs of, totally six positioning recesses 5h, 5i are formed at the inside of the three projecting pieces 5g on the inner periphery of the opening edges 5c so as to be adjacent to one another. As shown in FIGS. 9, 16, 18 and 20, three notches 32 are formed at three equi-angular positions of the inner periphery of the cover securing portion 31 which is integrally formed in the form of a ring on the outer periphery of the front end side opening 21a of the barrel type case 21, and projecting piece engagement grooves 33 are formed inside of the end portions in the clockwise direction of the notches 32. Three cover positioning ribs 34 are integrally formed at the inner corresponding positions of the three notches 32 on the inner peripheral surface of the front-side opening 21a of the barrel type case 21.

When the dome-type cover 5 is secured to the front-side opening 21a of the barrel type case 21, and the opening edge 5c of the dome-type cover 5 is inserted from the axial direction (the arrow a direction) into the cover securing portion 31 while the three projecting pieces 5g of the dome-type cover 5 are simultaneously inserted into the three notches 32 of the barrel type case 21, whereby three positioning ribs 34 are relatively inserted into the three recesses 5h. Subsequently, when the dome-type cover 5 is rotated in the arrow c direction corresponding to the clockwise direction in the cover securing portion 31, the three projecting pieces 5g are engagedly inserted into the three projecting piece engagement grooves 33, and at the same time the three positioning ribs 34 are engagedly fit to the three recesses 5i adjacent to the three recesses 5h against their elasticity so as to get over the recesses 5i, whereby the counterclockwise rotation of the dome-type cover 5 is prohibited by the three positioning ribs 34 and the dome-type cover 5 is held in the barrel type case 21 as it is at the rotational position of the clockwise direction. When the dome-type cover 5 is detached from the barrel type case 21, conversely to the securing operation, the dome-type cover 5 is rotated in the arrow d direction corresponding to the counterclockwise direction, and the three projecting pieces 5g are disengaged in the counterclockwise direction from the three projecting piece engagement grooves 33 into the three notches 32, whereby the three positioning ribs 34 get over from the three recesses 5i to the three recesses 5h against their elasticity. Therefore, the dome-type cover 5 may be pulled out from the cover securing portion 31 in the axial direction (arrow b direction) so that the three projecting pieces 5g are pulled out from the three notches 32.

(6) Description of Securing Stopper for Universal Joint Mechanism

Figure 9:
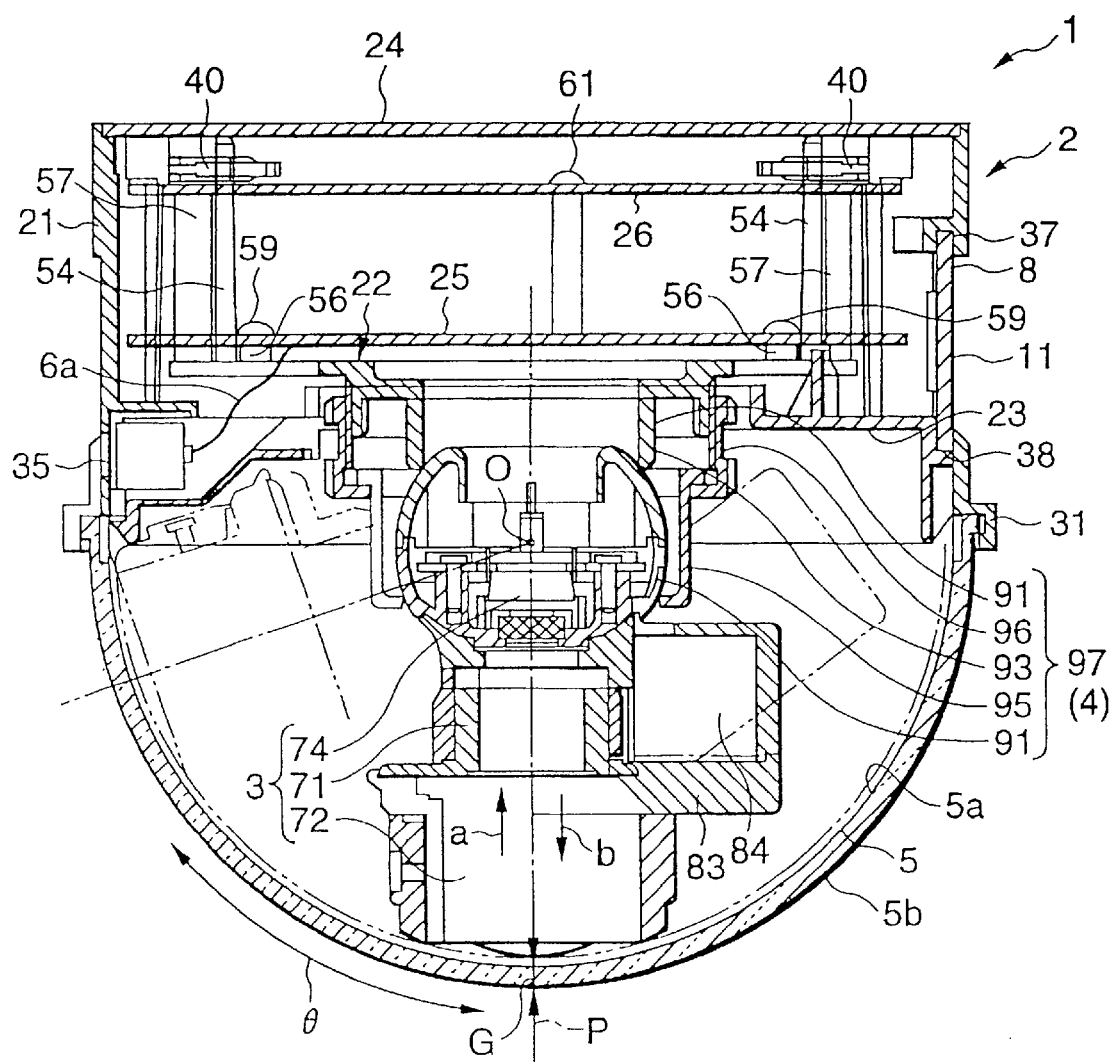
FIG. 9 is a longitudinal-sectional and side view of the dome-type video camera device.
Figure 21:
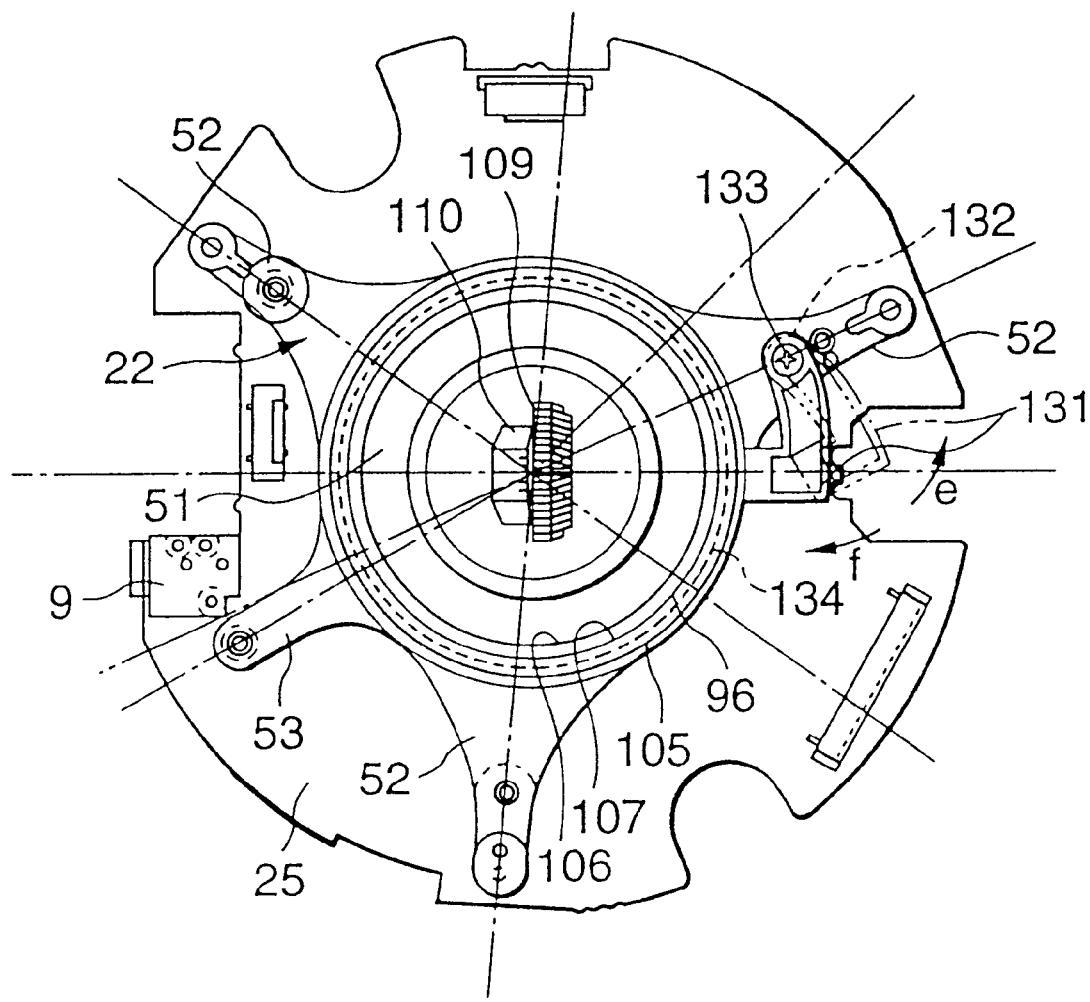
FIG. 21 is a front view showing a stopper of a joint ring in the dome-type video camera device.
Figure 22:
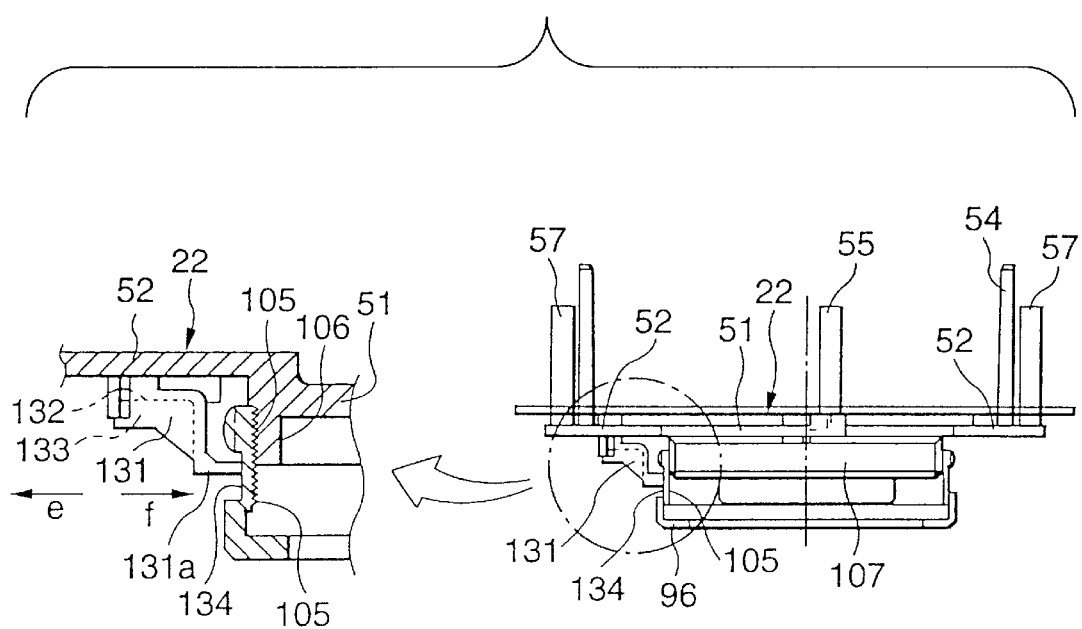
FIG. 22 is a partially-notched side view showing the stopper.

Next, the securing stopper 131 of the universal joint mechanism 4 will be described with reference to FIG. 9, FIG. 21 and FIG. 22. The stopper 131 is formed of metal or alloy resin substantially in an L-shape, and it is freely rotatably secured to the front surface side of one arm portion 52 of the main chassis 22 in the directions of arrows e, f by a set screw 33 with a spring washer 132. On the other hand, an annular groove 134 having a large width in the axial direction which is a stopper engaging portion is formed on the outer peripheral surface of the joint ring 96 of the universal joint mechanism (ball joint mechanism 97) 4.

Figure 10:
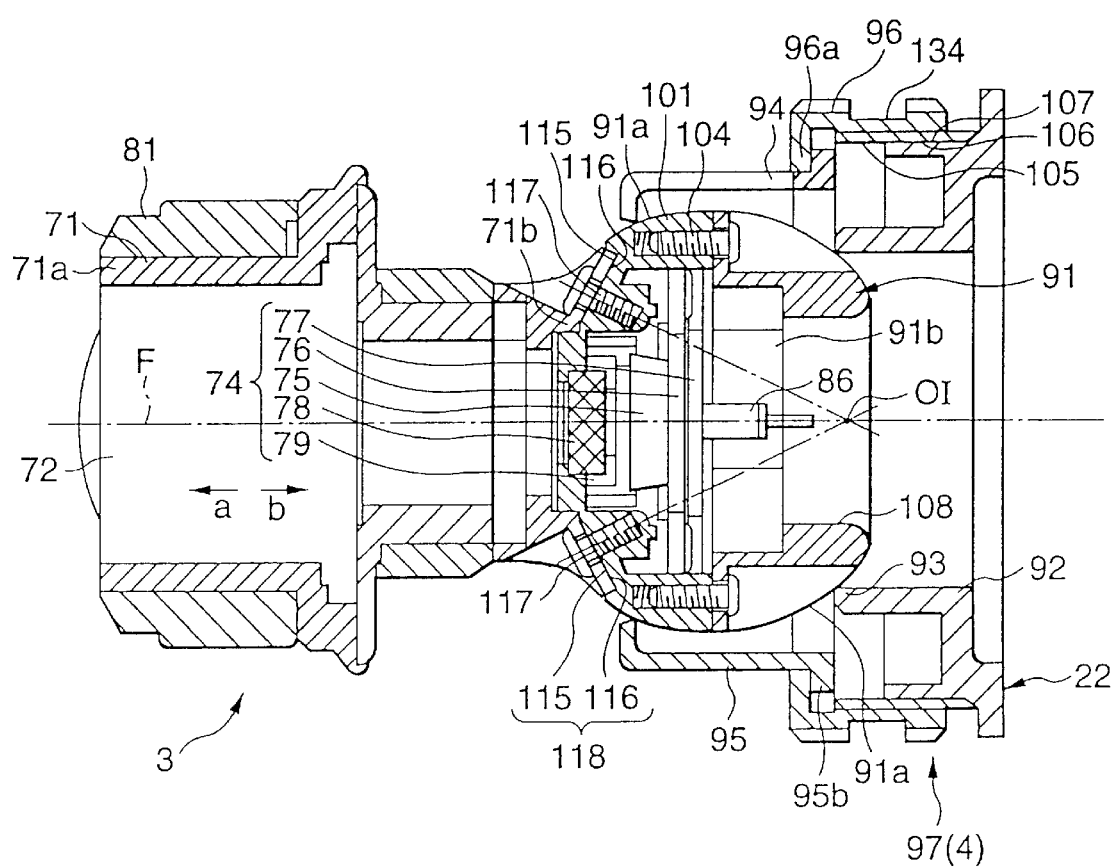
FIG. 10 is an enlarged sectional view taken along an arrow A—A of FIG. 13 showing a universal joint mechanism (ball joint mechanism) portion in the dome-type video camera device.

As described with reference to FIGS. 10 and 11, when the joint ring 96 of the universal joint mechanism 4 is threaded into the outer peripheral screw 107 of the main chassis 22 by the inner peripheral screw 105 to press and fix the spherical portion 91 of the mirror barrel 71 to the spherical portion supporting table 93, the stopper 131 is pushed by a driver or the like to rotate and relieve the stopper 131 in the direction of arrow e to a position indicated by a one-dotted chain line of FIG. 21 around the set screw 133 against the friction force of the spring washer 132. After the spherical portion 91 is joined by the joint ring 96, the stopper 131 is pushed by a driver or the like to rotate and return the stopper 131 in the arrow f direction to the position indicated by a solid line of FIG. 21 around the set screw 133 against the friction force of the spring washer 132, engagedly insert the tip 131a of the stopper 131 into the annular groove 134 of the joint ring 96 and press-fit the tip 131a to the outer peripheral surface of the joint ring 96 in the annular groove 134. A loosening-stopping function of the joint ring 96 is generated by the stopper 131, and the joint ring 96 can be beforehand prevented from being naturally loosened due to vibration or the like.

By securing the stopper 131 to the main chassis 22, even if after the barrel type main body 2 is secured to the ceiling 14 or the like by set screws, the inner peripheral screws 105 of the joint ring 95 fall off from the outer peripheral screws 107 of the main chassis 22 because the joint ring 95 of the universal joint mechanism 4 is erroneously excessively loosened in order to set the azimuth of the mirror barrel 71 when the dome-type vide camera device 1 is mounted to the ceiling 14 or the like from the lower side, the tip 131a of the stopper 131 can be beforehand prevented from falling from the main chassis 22 to the lower side of the joint ring 96. Accordingly, there can be beforehand prevented such an unfortunate situation that the mirror barrel 71 erroneously falls due to its dead weight and is broken during an installing work of the dome-type video camera device 1 to the ceiling 14 or the like, and the safety of the installing work of the dome-type video camera device 1 to the ceiling 14 or the like can be greatly enhanced.

Figure 23:
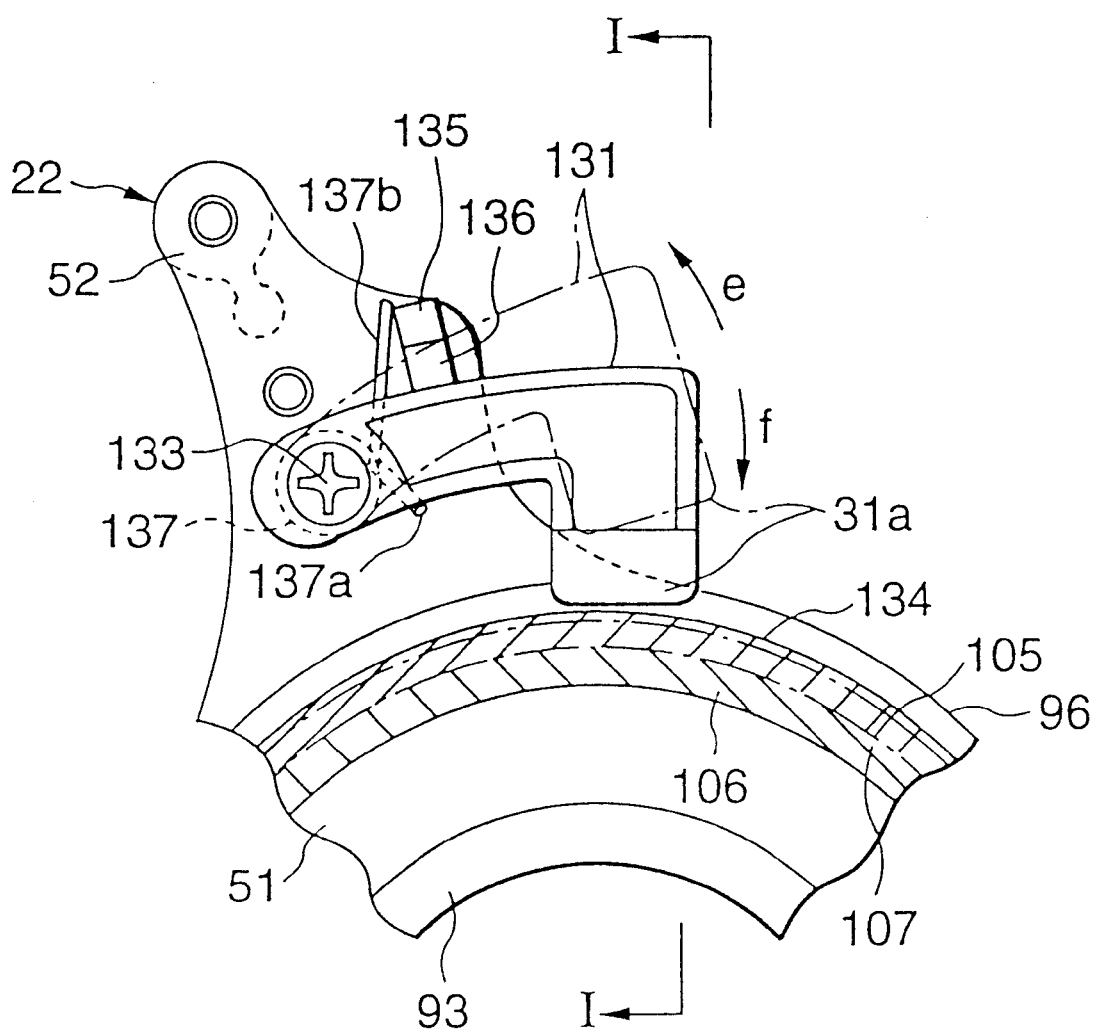
FIG. 23 is a front view showing a modification of the stopper.
Figure 24:
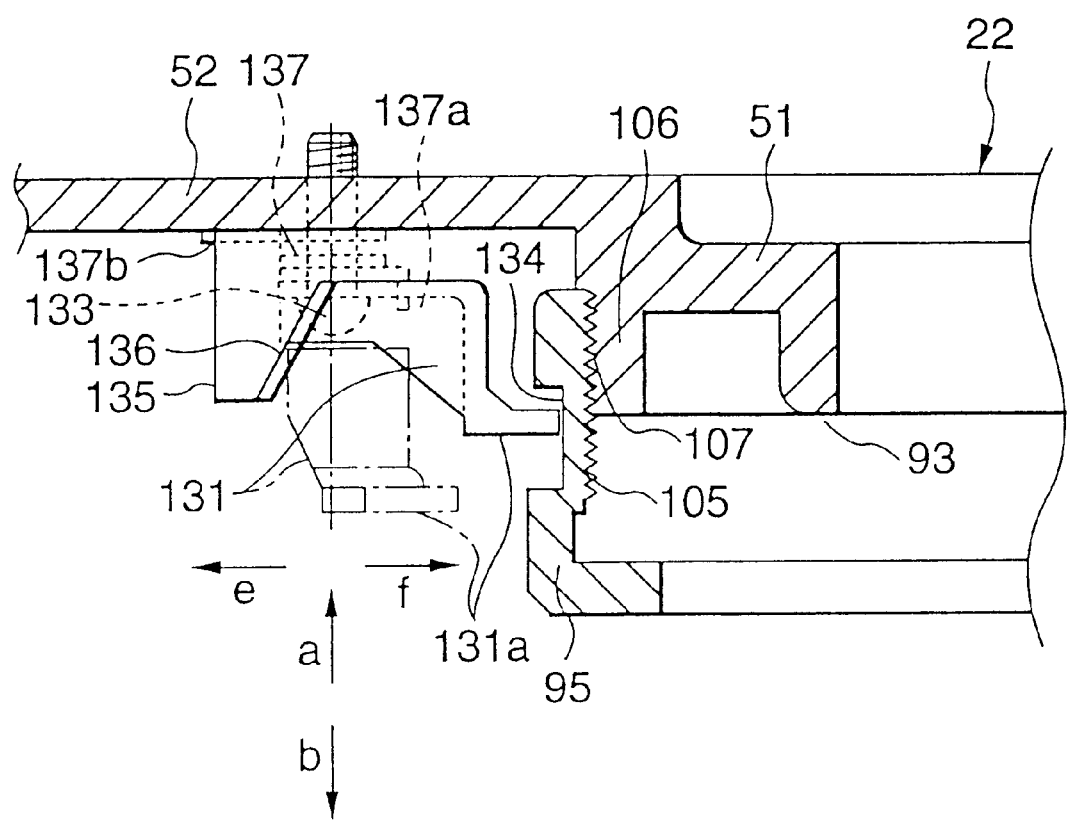
FIG. 24 is a cross-sectional view taken along an arrow I—I of FIG. 23 showing the stopper.

FIGS. 23 and 24 show a modification of the stopper 131, and a stopper guide 135 is integrally formed in parallel to the axial direction of the barrel type case 21 at the outside position of the securing position of the stopper 131 on the front surface of the arm portion 52 of the main chassis 22, and a slant surface 136 which approaches to the outer periphery of the joint ring 96 as it extends backward (the arrow a direction) is formed inside the stopper guide 135. A torsion coil spring 137 is inserted between the stopper 131 and the arm portion 52 on the outer periphery of the set screw 133 through which the stopper 131 is secured to the front surface of the arm portion 52 of the main chassis 22, and both the ends 137a, 137b of the torsion coil spring 137 are hooked to the stopper 131 and the stopper guide 135. By the compression repulsive force of the torsion coil spring 137, the stopper 131 is urged to be slid in the arrow b direction corresponding to the frontward direction with respect to the main chassis 22, and also by the torsion repulsive force, the stopper 131 is urged to be rotated in the arrow e direction corresponding to the direction to the outer peripheral side.

Accordingly, according to the modification of the stopper 131, when the set screw 133 is loosened in the arrow b direction, the stopper 131 is rotated and relieved in the arrow e direction by the torsion coil spring 137 so as to be guided along the slant surface 136 of the stopper guide 135 and pushed out in the arrow b direction to a separation position indicated by a one-dotted chain line in FIGS. 23 and 24. Subsequently, as the joint ring 96 of the universal joint mechanism 4 is threaded and secured into the outer peripheral screw 107 of the main chassis 22 by the inner peripheral screw 105 and then the set screw 133 is fastened in the arrow a direction by the driver, the stopper 131 is guided along the slant surface 136 of the stopper guide 135 against the torsion coil spring 137, and rotated in the arrow f direction while pushed in the arrow a direction to the engaging position indicated by a solid line of FIGS. 23 and 24, and the tip 131a of the stopper 131 is automatically engagedly inserted into the annular groove 134 of the joint ring 96. Accordingly, by merely fastening or loosening the set screw 133 in the arrow a, b directions with the driver, the stopper 131 can be automatically moved and adjusted in arrow e, f directions between the engaging position and the separation position with respect to the joint ring 96, and the fabrication work of the universal joint mechanism 4 can be performed with high efficiency.

As shown in FIG. 1 and FIGS. 7 to 9, the front-side cover 23 which is formed of a mold part (mold part of ABS resin or the like) in the shape of a disc is inserted into the outer periphery of the outer peripheral screw 107 by the circular hole 23a formed at the center thereof, and also inserted from the axial direction into the inside of the front-side opening 21a of the barrel type case 21, whereby the front-side cover 23 is detachably secured to the front surfaces of the three arm portions 52 of the main chassis 22 by the three set screws 65. Accordingly, the stopper 131 is closed inside the front-side cover 23. Two screw insertion cylinders 23b are integrally formed in parallel to the axial direction of the barrel type case 21 at the counter position of 180° on the outer periphery of the back surface side of the front-side cover 23. These two screw insertion cylinders 23b are designed to have such a sufficient length that it can substantially abut against the chassis lid plate 24, and two screw insertion holes 66 are formed at the same phase position as the two screw insertion cylinders 23b at the outer periphery of the chassis lid plate 24. Accordingly, when the dome-type video camera device 1 is secured to the ceiling 14 or the like from the lower side, the two set screws 67 are inserted from the lower side into the two screw insertion cylinders 23b by the driver, and these two set screws 67 can be easily inserted from the lower side into the two screw insertion holes 66 of the chassis lid plate 24, so that the barrel type main body 2 can be simply secured to the ceiling 14 or the like by the two set screws 67.

(7) Description of Installing Work of Dome-type Video Cameral Device 1 to Ceiling or the like and How-to-use of Monitor Output Terminal at That Time The installing method of the dome-type video camera device 1 to the ceiling 14 or the like will be described. First, the package of the dome-type video camera device 1 is unpacked and the dome-type cover 5 is detached from the barrel type main body 2. In this state, the joint ring 96 of the universal joint mechanism 4 (ball joint mechanism 97) is set under the joint state, and the optical block 3 is locked while inserted into the notch 94 of the angle adjusting ring 95.

Therefore, when the coaxial cable which is connected to the monitor television in the surveillance room is connected to the coaxial cable terminal 12 on the chassis lid plate 24 of the barrel type main body 2, the back surface (ceiling face) 2d of the barrel type main body 2 abuts against the ceiling 14 or the like from the lower side and then the log mark 7 of the front surface 2a of the barrel type main body 2 is set to face a desired image pickup direction, the sound collecting microphone 6 is set to the desired image pickup direction. Therefore, the two set screws 67 are successively inserted from the lower side of the barrel type main body 2 into the two screw insertion guides 23b by the driver, and the chassis lid plate 24 is joined to the ceiling 14 or the like by the two set screws 67 to fix the barrel type main body 2 to the ceiling 14 or the like.

Subsequently, the joint ring 96 of the universal joint mechanism 4 is slightly loosened to release the lock of the optical block 3. However, since the joint ring 96 is prevented from falling off by the stopper 131, the joint ring 96 can be loosened without anxiety. After the lock of the optical block 3 is released, the azimuth (direction and angle) of the mirror barrel 71 is set. At this time, the mirror barrel 71 can be freely rotationally adjusted at a large angle in every direction indicated by arrow X, Y, Z directions around the rotational center O, so that the setting of the azimuth of the mirror barrel 71 can be quickly and easily performed. In a case where the angle of the mirror barrel 71 is adjusted, if the mirror barrel 71 is adjusted while inserted in the notch 94 of the angle adjusting ring 95, the adjustment angle $\theta$ of the angle can be smoothly adjusted within a large range. When the azimuth of the mirror barrel 71 is set and then the log mark 85 is adjusted to a horizontal position while checking the heaven-and-earth direction of the log mark 85 of the front surface 83a of the convex portion 83 on the outer periphery of the mirror barrel 71, the mirror barrel 71 is rotationally adjusted around the optical axis F, and the heaven-and-earth direction of an image to be picked up can be correctly set. Therefore, after that, the rotation of the mirror barrel 71 is prevented while the convex portion 83, etc. of the mirror barrel 71 are pressed by a hand, and the joint ring 96 of the universal joint mechanism 4 is joined and the optical block 3 is locked.

Figure 25:
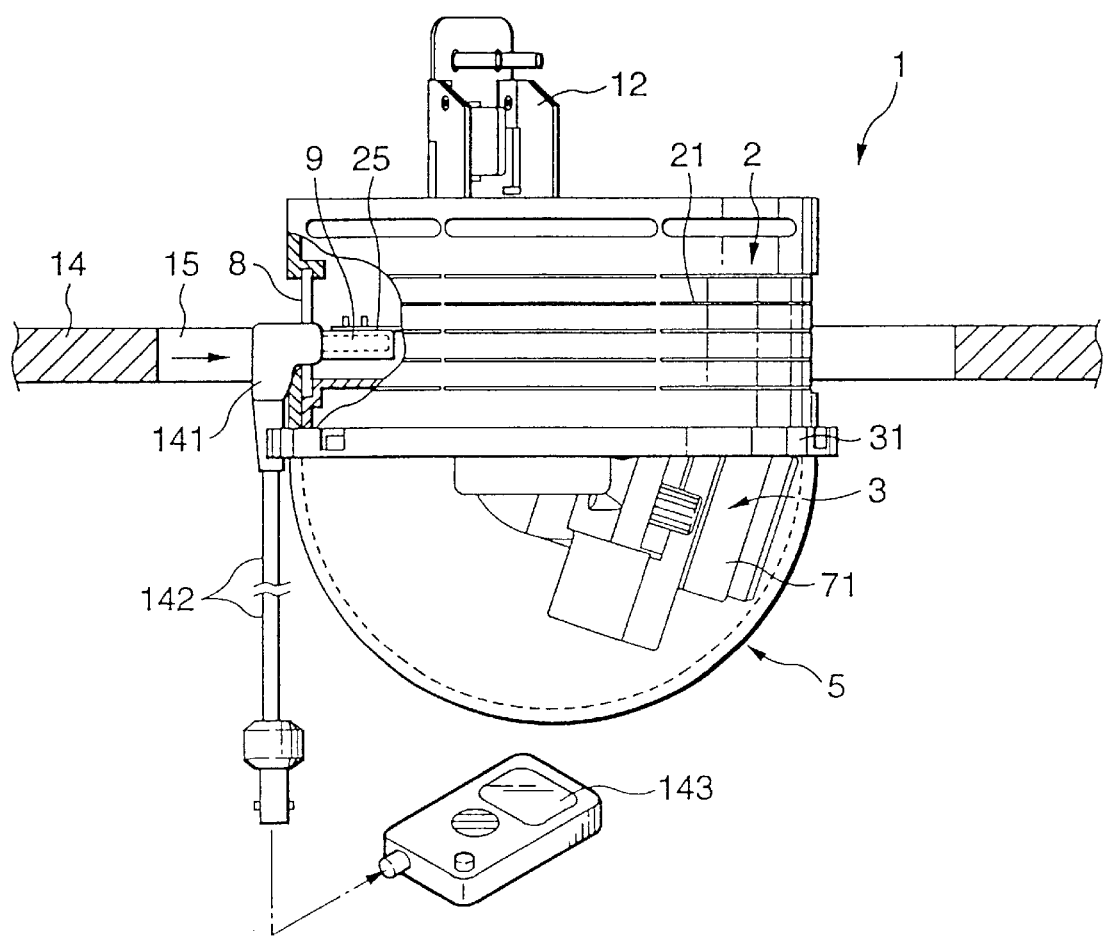
FIG. 25 is a partially notched side view showing a situation that a potable monitor television is connected to a monitor output terminal by using an L-type plug in the dome-type video camera device.

After that, the rotation adjustment is carried out on the focus ring 81 on the outer periphery of the mirror barrel 71 and the zoom lever 82 to perform setting of an image pickup range and focusing, and the image pickup direction, the image pickup range and the focusing state can be checked at the installing place. That is, as shown in FIG. 25, when the barrel type main body 2 is secured so as to be buried in the hole 15 of the ceiling 14 or the like (at this time, the dome-type video camera device 1 is installed by using a ceiling burying instrument (not shown)), a monitor output cable 142 having an L-type plug 141 is used, the L-type plug 141 is plugged into the monitor output terminal 9 on the back surface 2c of the barrel type main body 2 from the lateral side, and the monitor output cable 142 is connected to a portable monitor television 143 through a conversion connector cable (not shown) or the like to display a monitor image on the portable monitor television 143, whereby the image pickup direction, the image pickup range and the focusing state can be checked. At this time, a sound collection condition of sounds occurring around the dome-type video camera device 1 can be also heard from a speaker of the portable monitor television 143 through the sound collecting microphone 76.

At this time, the L-type plug 141 is inserted from the lateral side into the laterally-facing monitor output terminal 9 and the monitor output cable 142 can be suspended downwardly at the lateral side position of the barrel type main body 2. Therefore, when the azimuth of the optical block 3 is minutely adjusted, there is not such an anxiety that the monitor output cable 142 interferes with the optical block 3 to obstruct the adjustment work, and thus the fine adjustment work of the azimuth can be easily performed. Further, since the monitor output terminal 9 is solder-dipped into the signal processing board 25 in parallel to the mount face, there is little risk that the signal processing board 25 is damaged when the plug is inserted/pulled out into/from the monitor output terminal 9.

Figure 26:
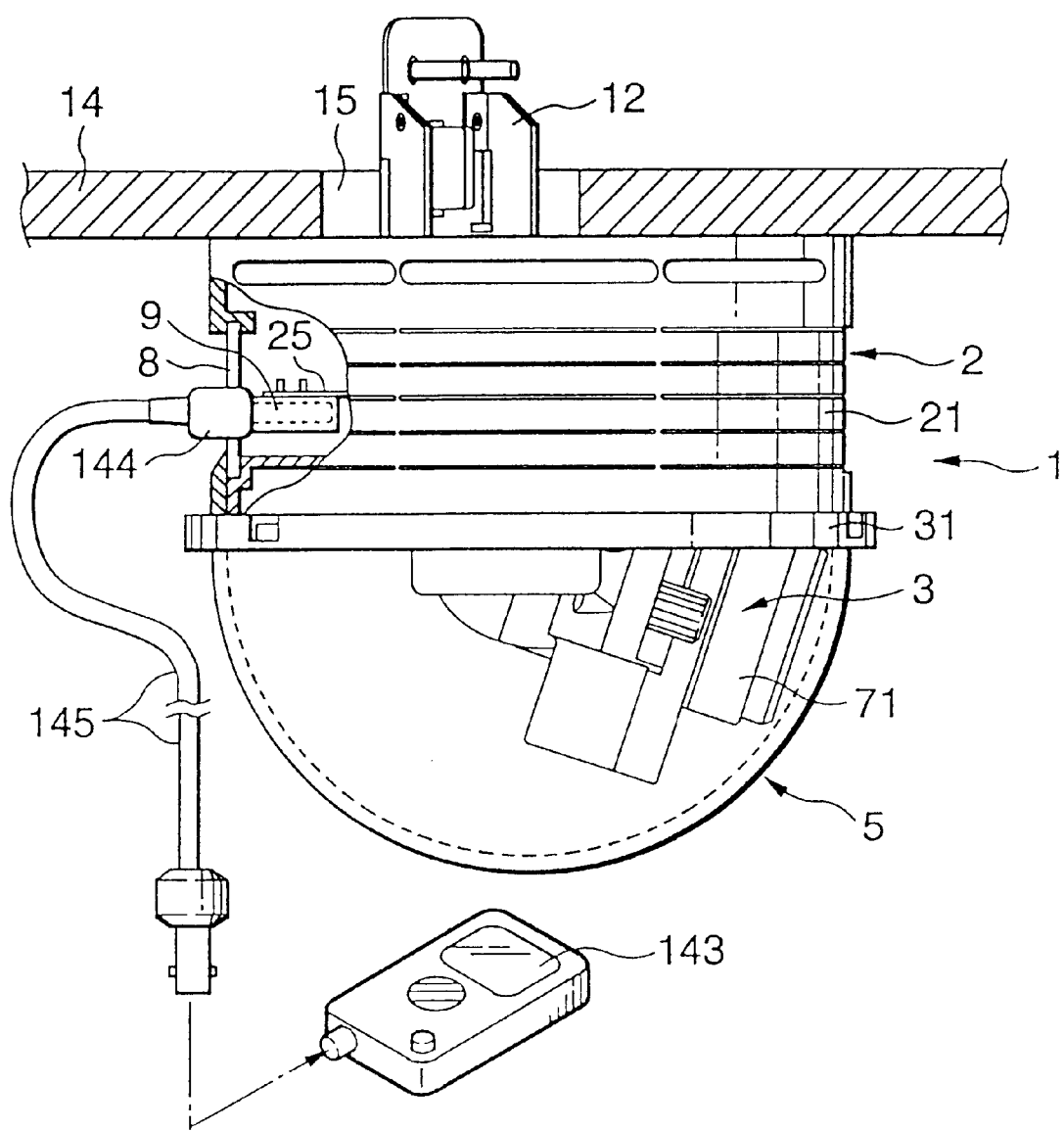
FIG. 26 is a partially-notched side view showing a situation that the potable monitor television is connected to the monitor output terminal by using a straight type plug in the dome-type video camera device.

As shown in FIG. 26, when the barrel type main body 2 is mounted below the ceiling surface, the monitor output terminal 9 is disposed below the ceiling 14 or the like, so that a monitor output cable 145 having a straight type plug 144 can be used and likewise the image pickup direction, the image pickup range and the focusing state can be checked by the portable monitor television 143. Thereafter, the dome-type cover 5 is inserted into the cover securing portion 31 of the barrel type main body 2, and the mount work of the dome-type video camera device 1 to the ceiling 14 or the like is finished. At this time, the opening edge 5c of the dome-type cover 5 is inserted and secured into the cover securing portion 31, so that dust, etc. hardly invade into the dome-type cover 5 and it can be beforehand prevented that the inside of the dome-type cover 5 is contaminated with dust or the like and a pickup image is unclear.

(8) Description of Forming Apparatus of Dome-type Cover

Next, an injection molding apparatus 151 based on acrylic resin for the dome-type cover 5 will be described with reference to FIGS. 30 to 33. In the injection molding apparatus 151, a side gate type forming mold is used, and a heavy and thick side gate 156 of width W21=about 8 mm and thickness T21=about 2 mm is formed at the position corresponding to one of the three projecting pieces 5g on the outer periphery of the dome-type cover 5 and at the lateral side portion of a parting face (divisional face) of a dome-type cavity 154 formed between a cavity side mold (fixed mold) 152 and a core side mold (variable mold) 153. A liner 157 for reducing the flow rate of melted resin is inserted along the parting face, and the thickness T22 of this liner 157 is set to about 8 mm. Both the core side spherical surface 154a and the cavity side spherical surface 154b of the dome-type cavity 154 are subjected to mirror-surface finishing, and the radius R21, R22 and the offset amount OS of the centers O21, O22 of these core side spherical surface 154a and the cavity side spherical surface 154b are offset to the same dimension and the same direction as the radius R11, R12 and the offset amount OS of the centers O11, O12 of the inner spherical surface 5a and the outer spherical surface 5b of the dome-type cover 5 described with reference to FIGS. 27 to 29. A thickness-varied processed portion 158 having a thickness T23=about 8.8 mm is formed along the parting surface 155 at the inner position of the liner 157 in the core side mold 153, and three projecting-piece process portions 159 are formed on the inner periphery of the liner 157. Accordingly, the parting surface side 154c of the dome-type cavity 154 is designed to have a narrow gap and the central portion (top portion) side 154d thereof is designed to have a wide gap. Further, a plurality of gas vents 160 each having a thickness T24 of about 0.02 mm are radially formed at the cavity side of the liner 157. The gas vents 160 are concentrically disposed at the counter position 162 to the side gate which is the position opposite to the side gate 156.

The injection molding apparatus 151 is designed as described above. The dome-type cover 5 having the structure and shape shown in FIGS. 27 to 29 can be formed by a forming cycle of passing melted resin MP of acrylic resin injected from an injection nozzle (not shown) through a liner 161, flowing it from the side gate 156 into the dome-type cavity 154, filling it in the dome-type cavity 154 and then cooling it.

At this time, by making the side gate 156 thick and heavy, the forming cycle can be set to a sufficient long time of about 90 seconds, and it is unnecessary to pay attention to gate solidification unlike the pin gate type molding mold, and thus the flow-in speed of the melted resin MP can be sufficiently lowered. Accordingly a dome-type cover 5 having small residual stress can be formed with high precision. Further, the gate is hardly solidified even after the melted resin MP is filled in the dome-type cavity 154, and thus the melted resin in the dome-type cavity 154 can be removed while applying sufficient pressure to the inside of the dome-type cavity 154 from the side gate 156. Accordingly, the dome-type cover 5 to which the shape of the dome-type cavity 154 can be surely transferred can be formed with high precision, and the high-quality dome-type cover 5 which does not have any deformation such as distortion or the like can be formed. By using a thick and heavy one-point gate, the dome-type cover 5 in which no weld line occurs and no image distortion occurs can be formed.

The parting surface side 154c of the dome-type cavity 154 is designed in a narrow gap structure and the central portion side 154d is designed in a wide gap structure by the offset of the radius R21, R22 of the core side spherical surface 154a and the cavity side spherical surface 154b of the dome-type cavity 154, whereby the flow of the melted resin MP flowing in the dome-type cavity 154 can be set so that the speed of the flow bypassed to the central portion side 154d is higher than the speed of the flow along the parting surface 155, and thus occurrence of a gas stagnation phenomenon in the dome-type cavity 154 is suppressed. Since the liner 157 is installed along the parting surface 155 and the plural gas vents 160 are formed, the gas in the dome-type cavity 154 can be smoothly escaped from the plural gas vents 160 during the flow of the melted resin MP into the dome-type cavity 154. Therefore, the gas stagnation phenomenon can be prevented from occurring in the dome-type cavity 154. Further, the thickness-varied processed portion 158 is formed along the parting surface of the dome-type cavity 154 to make the speed of the melted resin MP flowing along the parting surface 155 in the dome-type cavity 154 lower than the speed of that bypassed to the central portion side 154d, whereby the time at which the melted resin MP flowing along the parting surface 155 arrives at the side gate counter position 162 can be delayed with respect to the time at which the melted resin MP bypassed to the central portion side 154d arrives at the side gate counter position 162, and thus no gas stagnation occurs at the side gate counter position 162 side in the dome-type cavity 154.

Consequently, according to the injection molding apparatus 151, in the injection molding process of the dome-type cover 5, the speed V2 of the melted resin MP which is bypassed to the central portion side 154d and reaches the side gate counter position 162 is set to be higher than the speed V1 of the melted resin MP flowing from the side gate 156 into the dome-type cavity 154 arrives from both the sides of the peripheral direction along the parting direction 155 to the side gate counter position 162 as shown in FIGS. 32A to 32D. Accordingly, the gas occurring in the dome-type cavity 154 can be escaped to the side gate counter position 162 on the tip surface MP1 in the flow-in direction of the melted resin MP while smoothly and perfectly pushed out, and no gas stagnation occurs in the dome-type cavity 154. Therefore, a gas burning failure due to gas stagnation can be beforehand prevented.

That is, FIGS. 33A to 33D are explanatory diagrams showing the gas burning failure which easily occurs in the injection molding process of the dome-type cover 5. If the speed V1 at which the melted resin MP flowing from the side gate 156 into the dome-type cavity 154 arrives from both the sides in the peripheral direction along the parting surface 155 to the side gate counter position 162 is higher than the speed V2 at which the melted resin MP is bypassed to the central portion side 154d and arrives at the side gate counter position 162, as shown in FIGS. 33A to 33C, after the streams of the melted resin MP flowing along both the sides along the parting surface 155 more early arrive at the side gate counter position 162 and are mixed with each other, the stream of the melted resin MP bypassed to the central portion side 154d arrives at the side gate counter position 162 and mixed with the other streams. Therefore, as shown in FIG. 33C, gas stagnation 163 trapped by the melted resin MP occurs in the neighborhood of the side gate counter position 162 in the dome-type cavity 154. As shown in FIG. 33D, the gas stagnation 163 is reduced by the pressure of the melted resin MP, however, it is heated and burned to produce gas burning 164, so that the dome-type cover 5 becomes defective.

(9) Description of Applied Example of Video Camera Device

Figure 34:
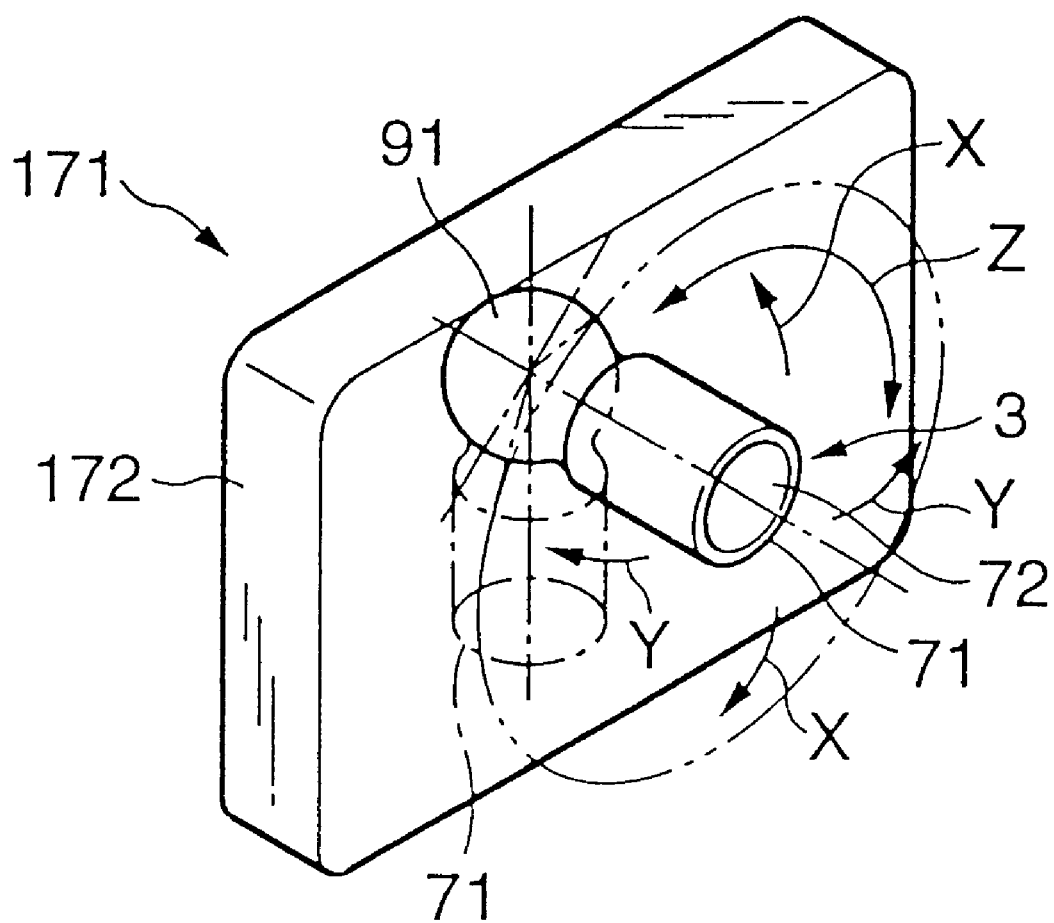
FIG. 34 is a perspective view showing an applied example of the video camera device.

Next, an application example of the video camera device will be described with reference to FIG. 34. Since the optical block 3 as described above is designed so that the spherical portion 91 is formed at the base end 71b of the mirror barrel 71 in which the lens 72 is accommodated and the CCD unit 74 is accommodated in the spherical portion 91, there can be implemented a convenient video camera device 171 in which as shown in FIG. 34, the optical block 3 can be secured to the body 172 of a video camera device 171 such as a digital video camera, a television telephone by the spherical portion 91 so as to be freely ratably adjustable in three axial directions of the arrow X, Y, X directions and the attitude of the mirror barrel 71 can be freely directed to the three axial directions. In addition, as indicated by a one-dotted chain line in FIG. 34, the mirror barrel 71 can be accommodated in the body 172 while it is folded in compact size.

The embodiments of the present invention are described, however, the present invention is not limited to the above embodiments and various modifications may be made on the basis of the technical idea of the present invention. For example, the present invention is not limited to the dome-type video camera device, but may be applied to another type video camera device. Further, the dome-type cover is not limited to only the dome-type video camera device, but applicable to any type equipment. Further, in the above embodiments, in the universal joint mechanism, the spherical portion is disposed at the variable side, and the spherical portion support table is disposed at the fixed side. However, the opposite arrangement may be adopted.

The video camera device of the present invention thus constructed has the following effects.

The angle adjusting mechanism of the lens comprises the spherical portion, the spherical portion support table and the joint ring, and it is designed as a ball joint mechanism which can adjust the rotation of the mirror barrel in the three axial directions around the center of the spherical portion, thereby miniaturizing the angle adjusting mechanism of the lens and simplifying the structure thereof. Therefore, the overall video camera device can be miniaturized in size and can be made light in weight. In addition, the angle adjustment range of the mirror barrel can be remarkably increased, and a wide-range image pickup operation having no blind spot can be performed. Accordingly, a video camera device which is most properly applicable to a dome-type video camera device can be provided.

Since the image pickup device is disposed on the optical axis of the mirror barrel in the spherical portion of the ball joint mechanism, even when the angle adjustment is made on the mirror barrel in any direction, there occurs no displacement in optical axis and the angle adjustment range of the mirror barrel can be further increased.

Since the joint face between the base end of the mirror barrel and the side surface of he spherical portion is designed as a taper surface along the spherical surface of the spherical portion, the joint portion between the base end of the mirror barrel and the spherical portion can be reduced in diameter. Therefore, the diameter of the spherical portion can be reduced, and the compact and light design of the ball joint mechanism can be achieved.

The joint screws for joining the base end of the mirror barrel to the side surface of the spherical portion are radially provided so that the centers of the joint screws are intersected to one another at one point on the optical axis. Therefore, uniform joint force can be produced around the optical axis, and the centering between the mirror barrel and the spherical portion and the parallel between the lens and the focusing face of the image pickup device can be maintained.

The spherical portion is constructed by two separable parts, and the image pickup device is disposed therein, so that the image pickup device can be easily installed into/pulled out from the spherical portion, the cost can be reduced due to enhancement of productivity, and the maintenance and check can be easily performed.

The signal cable insertion hole is formed at the opposite side to the mirror surface side of the spherical portion, so that the signal cable of the image pickup device installed in the spherical portion can be drawn out from the hole and easily connected to the signal processing board.

The ball joint mechanism is constructed by the angle adjustment ring having the spherical portion, the spherical portion support table and the notch and the joint ring, so that the angle adjustment of the mirror barrel can be widely and easily performed by the angle adjustment ring.

The signal cable of the automatic iris motor secured to the outer periphery of the mirror barrel is drawn into the spherical portion through the notch, and the outer area of the notch is closed by the lid, so that the signal cable of the automatic iris motor can be connected to the signal processing board through the spherical portion, and there is little risk that the signal cable is hooked to another and broken in the angle adjustment operation of the mirror barrel, so that the safety can be remarkably enhanced.

The convex portion is formed on the outer periphery of the lid for closing the outer area of the notch of the spherical portion, so that the convex portion interferes with another member before the signal cable interferes with the other member in the angle adjustment operation of the mirror barrel, whereby the signal cable can be smoothly escaped from the other member. Therefore, the signal cable can be further surely prevented from being broken.

What is claimed is:

1. A video camera device comprising:
    a spherical portion provided at the base end of a mirror barrel in which a lens is accommodated;
    a spherical portion supporting table provided to a chassis; and
    a joint ring for joining said spherical portion to said spherical portion supporting table, wherein a ball joint mechanism for rotatably adjusting said mirror barrel in three axial directions around the center of said spherical portion is constructed by said spherical portion, said spherical portion supporting table and said joint ring.

2. A video camera device comprising:
    a spherical portion provided at the base end of a mirror barrel in which a lens is accommodated;
    a spherical portion supporting table provided to a chassis; and
    a joint ring for joining said spherical portion to said spherical portion supporting table, wherein a ball joint mechanism for rotatably adjusting said mirror barrel in three axial directions around the center of said spherical portion is constructed by said spherical portion, said spherical portion supporting table and said joint ring, and an image pickup device is disposed on the optical axis of said mirror barrel in said spherical portion.

3. The video camera device as claimed in claim 2, wherein a signal cable penetration hole of said image pickup device is formed in the side surface opposite to the mirror barrel side of said spherical portion.

4. A video camera device comprising:
    a spherical portion provided detachably at the base end of a mirror barrel in which a lens is accommodated;
    a spherical portion supporting table provided to a chassis; and
    a joint ring for joining said spherical portion to said spherical portion supporting table, wherein a ball joint mechanism for rotatably adjusting said mirror barrel in three axial directions around the center of said spherical portion is constructed by said spherical portion, said spherical portion supporting table and said joint ring, wherein at least two joint screws for joining the base end of said mirror barrel to the side surface of said spherical portion are radially slanted so that the centers of said joint screws intersect to each other at one point on the optical axis of said mirror barrel.

5. A video camera device comprising:
    a spherical portion provided at the base end of a mirror barrel in which a lens is accommodated;
    a spherical portion supporting table provided to a chassis; and
    a joint ring for joining said spherical portion to said spherical portion supporting table, wherein a ball joint mechanism for rotatably adjusting said mirror barrel in three axial directions around the center of said spherical portion is constructed by said spherical portion, said spherical portion supporting table and said joint ring, wherein said spherical portion is constructed by two parts which can be joined to and separated from each other, and an image pickup device is disposed on the optical axis of said mirror barrel in said spherical portion.

6. The video camera device as claimed in claim 5, wherein a signal cable penetration hole of said image pickup device is formed in the side surface opposite to the mirror barrel side of said spherical portion.

7. A video camera device comprising:
    a spherical portion provided detachably at the base end of a mirror barrel in which a lens is accommodated;
    a spherical portion supporting table provided to a chassis; and
    a joint ring for joining said spherical portion to said spherical portion supporting table, wherein a ball joint mechanism for rotatably adjusting said mirror barrel in three axial directions around the center of said spherical portion is constructed by said spherical portion, said spherical portion supporting table and said joint ring, wherein a detachable joint surface between the base end of said mirror barrel and the side surface of said spherical portion is designed to be a tapered surface along the spherical surface of said spherical portion.

8. A video camera device comprising:
    a spherical portion which is detachably secured to the base end of a mirror barrel in which a lens is accommodated;
    a spherical portion supporting table provided to a chassis; and
    a joint ring for joining said spherical portion to said spherical portion supporting table, wherein a ball joint mechanism for rotatably adjusting said mirror barrel in three axial directions around the center of said spherical portion is constructed by said spherical portion, said spherical portion supporting stand and said joint ring and has a notch through which a signal cable of an automatic iris motor secured to the outer periphery of said mirror barrel is insertable into said spherical portion, and a lid which detachably closes the outside area of said notch.

9. A video camera device comprising:
    a spherical portion provided at the base end of a mirror barrel in which a lens is accommodated;
    a spherical portion supporting table provided to a chassis;
    an angle adjustment ring having a notch formed at a part of the outer periphery thereof, said mirror barrel being insertable through said notch in a direction perpendicular to the axial direction of said angle adjustment ring; and
    a joint ring for joining said spherical portion through said angle adjustment ring to said spherical portion supporting table, wherein a ball joint mechanism for rotatably adjusting said mirror barrel in three axial directions around the center of said spherical portion is constructed by said spherical portion, said spherical portion supporting table, said angle adjustment ring and said joint ring.

10. The video camera device as claimed in claim 7, wherein a convex portion is formed on the outer periphery of the end portion of said mirror barrel side of said lid.

* * * * *